(12) United States Patent
Carroll et al.

(10) Patent No.: US 10,046,869 B2
(45) Date of Patent: Aug. 14, 2018

(54) INERTIAL SENSING AUGMENTATION FOR NAVIGATION OF SPACECRAFT

(71) Applicants: Kieran A. Carroll, Brampton (CA); Daniel R. Faber, Cupertino, CA (US); Craig Foulds, Sunnyvale, CA (US)

(72) Inventors: Kieran A. Carroll, Brampton (CA); Daniel R. Faber, Cupertino, CA (US); Craig Foulds, Sunnyvale, CA (US)

( * ) Notice: Subject to any disclaimer, the term of this patent is extended or adjusted under 35 U.S.C. 154(b) by 0 days.

(21) Appl. No.: 15/009,005

(22) Filed: Jan. 28, 2016

(65) Prior Publication Data
US 2016/0214742 A1 Jul. 28, 2016

Related U.S. Application Data

(60) Provisional application No. 62/108,688, filed on Jan. 28, 2015.

(51) Int. Cl.
| | |
|---|---|
| *B64G 1/66* | (2006.01) |
| *G01C 21/16* | (2006.01) |
| *G01P 1/00* | (2006.01) |
| *G01P 21/00* | (2006.01) |

(52) U.S. Cl.
CPC ............. *B64G 1/66* (2013.01); *G01C 21/165* (2013.01); *G01P 1/00* (2013.01); *G01P 21/00* (2013.01)

(58) Field of Classification Search
CPC .. B64G 1/66; G01P 1/00; G01C 21/00; G01C 21/165
See application file for complete search history.

(56) References Cited

U.S. PATENT DOCUMENTS

| | | |
|---|---|---|
| 4,749,157 A | 6/1988 | Neufeld |
| 4,935,883 A | 6/1990 | Hulsing, II |
| 5,357,802 A | 10/1994 | Hofmeyer et al. |
| 6,125,698 A | 10/2000 | Schweitzer et al. |
| 6,898,970 B2 | 5/2005 | Berstis |
| 2005/0022402 A1 | 2/2005 | Ash et al. |
| 2007/0205331 A1 | 9/2007 | Janhunen |

(Continued)

OTHER PUBLICATIONS

Sutton et al., "A CubeSat Constellation to Investigate the Atmospheric Drag Environment," 24th Annual AIAA/USU Conference on Small Satellites (pp. 1-5) (2010).*

(Continued)

*Primary Examiner* — Aaron L Troost
(74) *Attorney, Agent, or Firm* — Panitch Schwarze Belisario & Nadel LLP

(57) ABSTRACT

The use of an accelerometer for inertial navigation of a low thrust spacecraft undergoing acceleration wherein the inaccuracy of the accelerometer is less than the uncertainty in the accuracy of a modeled non-gravitational component of the acceleration that the spacecraft is undergoing is disclosed. A method of navigating a spacecraft having a low thrust propulsion system is also disclosed. The method comprises engaging the low thrust propulsion system, measuring the acceleration of the spacecraft using an accelerometer with an inaccuracy less than the uncertainty in the acceleration imparted by the low thrust propulsion system and acquiring a trajectory estimate using the measured acceleration. The trajectory estimate may be updated using an external reference navigation sensor.

33 Claims, 8 Drawing Sheets

(56) References Cited

U.S. PATENT DOCUMENTS

| | | | |
|---|---|---|---|
| 2008/0177430 A1* | 7/2008 | Tekawy | B64G 1/242 |
| | | | 701/13 |
| 2010/0145620 A1 | 6/2010 | Georgi et al. | |
| 2012/0210783 A1 | 8/2012 | Carroll et al. | |
| 2014/0007646 A1 | 1/2014 | Rodney et al. | |
| 2015/0276975 A1 | 10/2015 | Carroll | |

OTHER PUBLICATIONS

International Search Report and Written Opinion dated May 2, 2016 in International Application No. PCT/CA2016/050068.
International Search Report and Written Opinion dated Jul. 10, 2015 in International Application No. PCT/CA2015/000191.
"Encyclopedia of Solid Earth Geophysics," Springer, pp. 449-456; 494-497 (2011).
Adams et al., "Precision Measurement of Satellite Acceleration: The LOGACS Experiment," Air Force Report No. SAMSO TR 69-6, Aerospace Report No. TR-0200(4306-02)-5, pp. 1-37 (Jul. 15, 1968).
"Apollo 17 Preliminary Science Report," NASA SP-330, National Aeronautics and Space Administration, USA, Chapters 12 and 13 (1973).
Nabighian et al., "Historical development of the gravity method in exploration," Geophysics, vol. 70, No. 6, pp. 63ND-89ND (2005).
Pilinski et al., "An Innovative Method for Measuring Drag on Small Satellites," 23rd Annual AIAA/USU Conference on Small Satellites, pp. 1-12 (2009).
Extended European Search Report dated Sep. 21, 2017 in EP Application No. 15768304.6.
Office Action dated Nov. 6, 2017 in U.S. Appl. No. 14/672,808, by Carroll.

* cited by examiner

INERTIAL SENSING AUGMENTATION FOR NAVIGATION OF SPACECRAFT

CROSS-REFERENCE TO RELATED APPLICATIONS

This application claims the benefit of U.S. Provisional Patent Application No. 62/108,688 filed on Jan. 28, 2015 entitled "INERTIAL SENSING AUGMENTATION FOR NAVIGATION OF LOW-THRUST SPACECRAFT", which is incorporated by reference herein in its entirety.

FIELD

The present disclosure relates to spacecraft navigation. More specifically, it relates to the use of inertial sensors to improve navigation of spacecraft experiencing prolonged acceleration.

BACKGROUND

Navigation of a spacecraft is the act of determining the spacecraft's position in space. Several different techniques for navigation have been used in the past, the choice of technique varying from one spacecraft to another depending on several factors. For spacecraft equipped with propulsion capability, one of those factors is the method of propulsion used.

Many different technologies are used for spacecraft propulsion. High thrust propulsion, typically provided by chemical rockets, is required by launch vehicles used to launch spacecraft from Earth because of the high gravity near the surface of the Earth and air resistance from the atmosphere. High thrust propulsion is also used frequently by spacecraft once in space. Accordingly, navigation techniques and infrastructure have been developed that are suited to high thrust spacecraft.

One technique for navigating spacecraft—in orbit around the Earth, the Sun, or other planetary bodies—that employ high-thrust propulsion uses one or more on-board accelerometers as well as external reference navigation sensing methods such as, for example, radio tracking from Earth. Altering the trajectory of such a spacecraft can be accomplished by determining the spacecraft's initial trajectory (which can be described in terms of its position and velocity with respect to some convenient reference frame) using radio tracking prior to making a propulsive manoeuvre (a "burn"), calculating the change in velocity ($\Delta v$) required to alter its trajectory in the desired direction and amount, and performing a high thrust rocket burn while measuring acceleration (integrated to get $\Delta v$). The $\Delta v$ estimate from the acceleration measurements can be used to make a decision on-board the spacecraft as to when to terminate thrusting, and a second radio tracking fix can be used to confirm the new trajectory. There is typically some uncertainty in the thrust expected to be generated by the propulsion system, because it is difficult to completely calibrate the performance of such systems in advance of use. Inertial sensing using accelerometers is used to compensate for this uncertainty by estimating the accumulation of $\Delta v$ over the course of the burn, allowing an on-board decision to terminate thrusting when the desired $\Delta v$ has been achieved.

However, acceleration measured by the accelerometers will include some error, and hence there will be an error in the estimated $\Delta v$. The amount of this error typically grows larger with time. Because velocity changes occur rapidly with high-thrust propulsion, the period of time over which that error can build up is relatively small (typically on the order of hours or less, and the $\Delta v$ error resulting from each burn can be resolved quickly following each burn. For example, it may be corrected using one or two subsequent smaller, shorter burns, with additional radio tracking fixes performed before and after each burn.

More recently, a greater number of propulsive options have become available for propulsion in space, away from high gravity objects and drag forces. These include low thrust propulsion systems, often chosen for their greater efficiency and lower mass, such as ion engines, solar sails, Hall thrusters, VASIMIR thrusters and the like. In contrast to high thrust options, for which the desired $\Delta v$ is usually accomplished within a short period of time (seconds, minutes or hours), low thrust propulsion systems can require days or weeks of continuous thrusting to achieve the $\Delta v$ needed for a significant course change. Because of the prolonged thrusting, while uncertainty in the thrust generated by the propulsion system may be small, it can accumulate over time to cause large errors in the resulting trajectory. Similarly, accelerometer sensing errors and errors in the resulting value of spacecraft $\Delta v$ and position can accumulate to much larger values over the duration of prolonged thrusting.

Natural effects can impart low acceleration disturbances to a spacecraft's trajectory over a prolonged period and cause that trajectory to slowly deviate from a purely ballistic trajectory. There may also be uncertainty in the magnitude and direction of the forces from such natural low-acceleration perturbation effects. For example, one such effect is solar radiation pressure. Solar radiation pressure causes a force whose magnitude and direction are sensitive to a spacecraft's orientation, to details of its shape, and to various optical properties (e.g., reflectivity) of its various surfaces, knowledge of each of which may be uncertain to some extent. Uncertainty in the small forces imparted on a spacecraft by such natural effects can cause uncertainty in the spacecraft's trajectory to accumulate to large values over long periods of time. These periods of time can be long enough that accumulating errors from accelerometers render inertial sensing of such changes in the trajectory impractical. As a result, external reference navigation sensing techniques, such as radio tracking, relative navigation using on-board optical sensors, and other techniques such as ranging using laser communications have been preferred in low-thrust missions. However, these methods require communication with a ground station on Earth to make a navigational "fix." Over months or years of low-thrust manoeuvring, many such communications sessions may be needed to maintain an accurate assessment of the evolving spacecraft trajectory.

Radio tracking and communications with spacecraft is expensive, particularly for spacecraft far from Earth, and existing facilities, such as NASA's Deep Space Network (DSN), are already oversubscribed. Several current trends are likely to make this situation worse. The cost of access to space is declining, low thrust propulsion options are becoming more popular and spacecraft are getting smaller and more affordable leading to a greater number of spacecraft being built. Consequently, the number of spacecraft needing to be tracked and the total tracking time required seem set to increase rapidly, making it harder for the existing tracking infrastructure to keep up with the growing demand.

SUMMARY

According to a first embodiment, the use of an accelerometer for inertial navigation of a low thrust spacecraft undergoing non-ballistic acceleration is disclosed. In the first embodiment the inaccuracy of the accelerometer is less than the uncertainty in the accuracy of a modeled non-gravitational component of the acceleration that the spacecraft is undergoing.

In another embodiment the inaccuracy of the accelerometer is 1 micro-g or less.

In another embodiment the accelerometer is rotatable.

In another embodiment the accelerometer takes at least two measurements separated by an angular distance and the at least two measurements are used to calculate an instrument bias and a corrected acceleration measurement.

In another embodiment the accelerometer is continuously rotating.

In another embodiment measuring the acceleration of the spacecraft comprises aligning an accelerometer with a positive thrust direction, taking a first acceleration measurement, aligning the accelerometer with a negative thrust direction, taking a second acceleration measurement and calculating an instrument bias and a corrected acceleration measurement from the first acceleration measurement and the second acceleration measurement.

A method of navigating a low thrust spacecraft having a low thrust propulsion system is also disclosed. The method comprises engaging the low thrust propulsion system, measuring the acceleration of the spacecraft using an accelerometer with an inaccuracy less than the uncertainty in the acceleration imparted by the low thrust propulsion system (and other non-ballistic forces) and estimating a trajectory state using the measured acceleration.

In another embodiment of the method the inaccuracy of the accelerometer is 1 micro-g or less.

In another embodiment of the method the accelerometer is rotatable.

In another embodiment of the method the accelerometer takes at least two measurements separated by an angular distance and the at least two measurements are used to calculate an instrument bias and a corrected acceleration measurement.

In another embodiment of the method the accelerometer is continuously rotating.

In another embodiment of the method measuring the acceleration of the spacecraft comprises aligning an accelerometer with a positive thrust direction, taking a first acceleration measurement, aligning the accelerometer with a negative thrust direction, taking a second acceleration measurement and calculating an instrument bias and a corrected acceleration measurement from the first acceleration measurement and the second acceleration measurement.

In another embodiment of the method, the trajectory state is updated using an external reference navigation unit.

A method of providing inertial navigation capability for a low thrust spacecraft is disclosed. The method comprises providing an accelerometer, wherein an inaccuracy of the accelerometer is less than an uncertainty in the accuracy of a modeled non-gravitational component of the acceleration of the spacecraft.

In another embodiment of the method the inaccuracy of the accelerometer is 1 micro-g or less.

In another embodiment of the method, the accelerometer is rotatable.

In another embodiment of the method, the accelerometer is configured to take at least two measurements separated by an angular distance and the at least two measurements are used to calculate an instrument bias and a corrected acceleration measurement.

In another embodiment of the method, the accelerometer is configured to continuously rotate.

In another embodiment of the method, the accelerometer is configured for rotation into a first position aligned with a positive thrust direction, taking a first acceleration measurement at the first position, rotation into a second position aligned with a negative thrust direction, taking a second acceleration measurement at the second position, and an instrument bias and a corrected acceleration measurement is calculated using the first acceleration measurement and the second acceleration measurement.

A low thrust spacecraft is disclosed. The spacecraft comprises a propulsion system; an accelerometer, wherein an inaccuracy of the accelerometer is less than an uncertainty in the accuracy of a modeled non-gravitational component of the acceleration of the spacecraft; and a processor configured to estimate a trajectory state of the low thrust spacecraft using acceleration measurements from the accelerometer.

In another embodiment of the spacecraft, the inaccuracy of the accelerometer is 1 micro-g or less.

In another embodiment of the spacecraft, the accelerometer is rotatable.

In another embodiment of the spacecraft, the accelerometer is configured to take at least two measurements separated by an angular distance and the at least two measurements are used to calculate an instrument bias and a corrected acceleration measurement.

In another embodiment of the spacecraft, the accelerometer is configured to continuously rotate.

In another embodiment of the spacecraft, the accelerometer is configured for rotation into a first position aligned with a positive thrust direction, taking a first acceleration measurement at the first position, rotation into a second position aligned with a negative thrust direction, taking a second acceleration measurement at the second position, and an instrument bias and a corrected acceleration measurement is calculated using the first acceleration measurement and the second acceleration measurement.

In another embodiment of the spacecraft, the spacecraft also includes an external reference navigation unit.

In another embodiment of the spacecraft, the external reference navigation unit includes a transceiver configured to send and receive communications and/or tracking signals A method of navigating a spacecraft undergoing prolonged non-ballistic acceleration is disclosed. The method includes measuring an acceleration of the spacecraft using an accelerometer with an inaccuracy less than an uncertainty in an accuracy of a model of the prolonged non-ballistic acceleration of the spacecraft, and estimating a trajectory state using the measured acceleration.

In another embodiments of the method, measuring the acceleration of the spacecraft includes taking a first acceleration measurement with the accelerometer rotated to a first direction relative to an inertial reference frame; taking a second acceleration measurement with the accelerometer rotated to a second direction relative to the inertial reference frame; and calculating an instrument bias and a corrected acceleration measurement from the first acceleration measurement and the second acceleration measurement.

In another embodiment of the method, the accelerometer is continuously rotating. In another embodiment of the method, the inaccuracy of the accelerometer is 1 micro-g or less.

A spacecraft is disclosed. The spacecraft includes an accelerometer, wherein an inaccuracy of the accelerometer is less than a second uncertainty in an accuracy of a modeled non-gravitational component of a prolonged acceleration of the spacecraft; and a processor configured to estimate a trajectory state of the spacecraft using acceleration measurements from the accelerometer.

In another embodiment of the spacecraft, the accelerometer is configured to take at least two measurements separated by an angular distance; and the processor is configured to estimate the trajectory state using the at least two measurements to calculate an instrument bias and a corrected acceleration measurement.

In another embodiment of the spacecraft, the accelerometer is configured to continuously rotate. In another embodiment of the method, the inaccuracy of the accelerometer is 1 micro-g or less.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figures 1A, 1B:
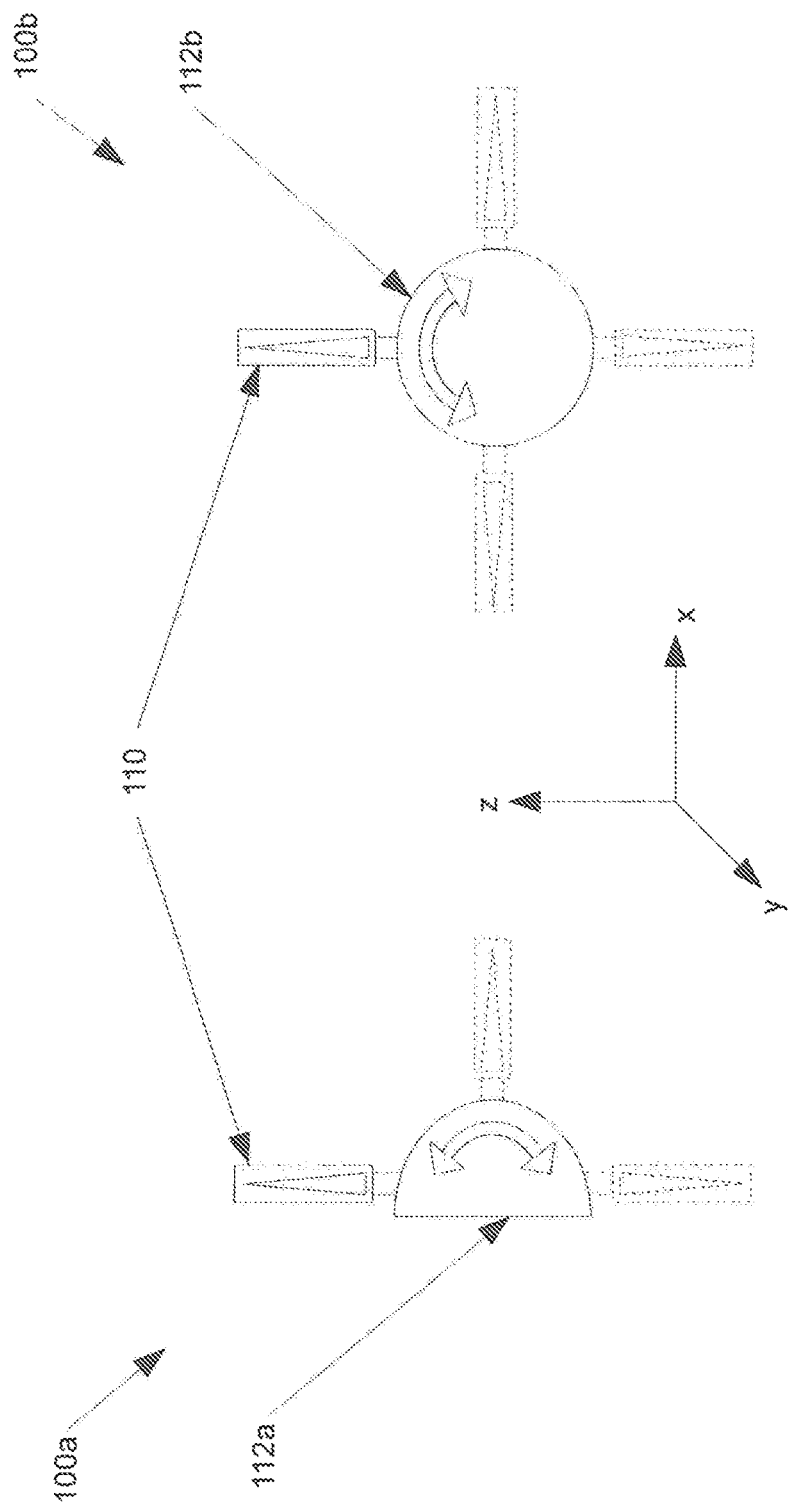
FIG. 1A shows a schematic representation of an example of a single-axis accelerometer mounted on a single-axis gimbal.
FIG. 1B shows a schematic representation of another example of a single-axis accelerometer mounted on a single-axis gimbal.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DESCRIPTION OF EXEMPLARY
EMBODIMENTS

Navigation is the process of monitoring and controlling the position and motion of an object, such as a ship or spacecraft, over time. Navigation may involve estimating the object's location by making measurements using suitable instruments, and making computations based on models of what those instruments measure. For example, marine navigation has historically employed magnetic compasses, with accompanying models of the direction of the Earth's magnetic field, and various astronomical instruments such as sextants, with accompanying models of the positions on the sky of the fixed stars and the motions across the sky of the Sun, the Moon and other celestial bodies. More recently, high-accuracy chronometers have been used in conjunction with those other instruments to estimate the locations of ships at sea.

To navigate a spacecraft, several different techniques have been used. Some spacecraft are equipped with a propulsion system used to alter the spacecraft's trajectory in some desired manner. If subjected only to gravitational forces from the Earth, the Sun, other planets, and other celestial bodies in the Solar system the spacecraft would follow a purely ballistic trajectory. In that case, if such a spacecraft's position and velocity were both known at one point in time, its position and velocity could be determined at any future time by integrating the acceleration due to these gravitational forces (which are well known) to determine change in velocity, and integrating velocity to find change in position. For spacecraft, the choice of navigation technique can vary from one spacecraft to another depending on several factors, such as the type of propulsion system being used, or the spacecraft's mission.

Typically, external reference navigation systems (or external reference navigation units) are used to navigate spacecraft. External reference navigation units include external reference navigation sensors that are configured to acquire data about the relative position of the spacecraft and at least one external point of reference, such as the Earth. One example of an external reference navigation unit uses radio navigation techniques (e.g. range and range-rate tracking from ground stations on Earth, followed by filtering of these measurements using a trajectory model) to estimate the position and velocity of spacecraft at certain points in time, and equivalently their orbital elements, following which a spacecraft's future position and velocity is estimated by integrating the known ballistic acceleration to determine change in velocity, and integrating velocity to find change in position. Estimates using these techniques have an accuracy limited only by the accuracy of the radio navigation signals, and by the knowledge of the masses and locations of the various gravitating bodies in the Solar system. This navigation accuracy can generally be improved by making additional measurements using the radio tracking equipment.

Other external reference navigation systems can also be used to navigate spacecraft. For example, for a spacecraft equipped with a laser communications system, the time of flight of the laser signal from Earth to the spacecraft and back may be used to ascertain the spacecraft's range from the ground-station on Earth. For another example, a spacecraft may be equipped with optical sensors, which may be used to sense the direction of one or more planets or asteroids from the spacecraft's position. This direction information may in turn be used, in combination with ephemerides for those bodies and knowledge of the time when images were taken using those optical sensors, to help establish the position of the spacecraft within the Solar system. However, in such spacecraft the images from the optical sensors may need to be transmitted to ground controllers on Earth for interpretation.

Inertial navigation is a sub-field within the general field of navigation. As described in Avril B. Chatfield, "Fundamentals of High Accuracy Inertial Navigation," Vol. 174, Progress in Astronautics and Aeronautics, American Institute of Aeronautics and Astronautics, Virginia, Third printing, 1997, Chapter 1, Section IV, "inertial navigation can be defined as the computation of current velocity and position from the initial velocity and position and time history of kinematic acceleration."

To measure the kinematic acceleration of a vehicle, an inertial sensor referred to as an accelerometer can be used. Inertial sensors are sensors which generate signals in response to changes in position or orientation with respect to an inertially-fixed reference frame. Estimating the vehicle's position from the acceleration measured by the accelerometer involves the kinematic relationships that velocity is the derivative with respect to time of position, and acceleration is the derivative with respect to time of velocity. Inertial navigation systems may include a processor, or other integration unit, that can be configured to integrate the measurements from one or more accelerometers with respect to time to estimate changes in velocity over time, and integrate the estimated velocity with respect to time to estimate changes in position.

The simplest inertial navigation systems may include only a single accelerometer as their sole instrument, which can be used to estimate changes in position along a single directional axis. Some inertial navigation systems may include several (usually 3) accelerometers pointing in (usually orthogonal) directions, as well as several (usually 3) inertial angular rate sensors pointing in (usually the same orthogonal) directions. With this configuration of inertial sensors, changes in the position and velocity of a vehicle may be estimated in any possible direction, along with the vehicle's orientation and rate of change of orientation, for a vehicle whose orientation changes with time.

Inertial sensors may have advantages in navigation situations. Inertial sensors are self-contained (having no need to sense anything outside of the sensors themselves) and hence tend not to suffer from external interference or poor observing conditions. Inertial sensors can typically be sampled rapidly, enabling the resulting navigation system to be used to command the autonomous operation of a vehicle's position control system. For example, inertial navigation systems have been used to provide continuously-updated navigation solutions to an aircraft's autopilot. However, no inertial sensor is perfect, and all such sensors produce measurements contaminated with errors. The errors in the inertial sensor measurements result in errors in the resulting estimates of position and velocity. These position and velocity estimate errors typically grow larger with time (i.e. with prolonged accelerations), and may eventually reach values that are intolerably large for the navigation application for which they are being used.

For this reason, inertial navigation systems frequently employ additional instruments, whose purpose is to constrain the growth of errors in position and velocity estimates to tolerable values. Such additional instruments generally make a measurement of something external to the vehicle being navigated; these instruments and systems are herein referred to as external reference navigation sensors and external reference navigation units. For example, for aircraft a VHF Omni Directional Radio Range (VOR) radio receiver is one type of external reference navigation sensor, which measures aircraft location with respect to a network of VHF radio beacons; a GPS radio receiver performs a similar function by measuring aircraft location with respect to a network of radio beacons located in the Global Positioning System constellation of Earth-orbiting satellites. For spacecraft; an example of an external reference navigation system includes the Unified S-band (USB) tracking and communication system used to measure the range between the Apollo lunar-exploration spacecraft and a ground station on Earth, as well as the rate of change with respect to time of that range.

A modern external reference navigation sensor that provides functionality similar to that of the Apollo USB—measuring range and range-rate with respect to Earth-based tracking stations—is a tracking transceiver used by spacecraft that leave Earth's orbit (thus travelling into "deep space"). The tracking transceiver communicates with NASA's Deep Space Network (DSN) to perform range and range-rate tracking. Another example of external reference navigation units includes optical imaging sensors aboard spacecraft, which can be operated to collect images of planetary targets. By knowing the direction the sensor was pointed in when collecting an image, the position of the planetary target in the image can be used to derive information regarding the spacecraft's location relative to that target—this technique may be referred to as optical navigation, or optical relative navigation.

A further example of an external reference navigation unit includes optical communication transceivers using laser transmitters. As with radio communications, the range between the spacecraft and the Earth may be measured using laser communications links. Another laser-based method for external reference navigation sensing includes laser rangefinding between a spacecraft and a nearby planetary body's surface, using a LIDAR instrument.

While external reference navigation units may compensate for errors arising from imperfections in inertial sensors, such external reference navigation sensors themselves have imperfections and limitations. For example, any external reference navigation unit that requires data to be processed by operators on Earth requires its measurements to be transmitted to Earth over a communications link. However, communications with spacecraft is difficult because of the large distance between spacecraft and Earth, especially for spacecraft travelling in deep space. This difficulty generally results in ground stations on Earth being expensive installations; few of which have been built. This is turn results in frequent competition for communications time between various deep-space missions, and a high cost being charged to each mission for using those facilities. As a result, it may be desirable to schedule communications sessions with spacecraft to be few and far between. In addition, the rate at which data can be brought down to Earth from the spacecraft over such links is typically relatively slow, so that data-intensive sensing methods (such as optical imaging) take a long time to send their images to Earth for processing.

To overcome the issues associated with inertial navigation sensors and external reference navigation sensors, a system combining such sensors may be implemented. As will be discussed in more detail below, sufficiently accurate inertial navigation sensors can be used to continually produce updated navigation solutions, i.e. estimated trajectories, onboard a spacecraft in-between navigation "fixes", the latter being updated trajectory estimates provided by external reference navigation units. This may provide increased accuracy in the estimation of a spacecraft's trajectory; while reducing amount of communication with Earth required, and thereby reducing the associated costs. Such improved inertial sensors may be particularly important for spacecraft undergoing prolonged periods of acceleration, such as acceleration occurring over a period of a day or more, even weeks or months of prolonged acceleration.

Various forces can act on a spacecraft and affect its trajectory. One natural force that acts on spacecraft whenever they are in sunlight is the force caused by sunlight being absorbed by and/or reflected from the spacecraft. This solar radiation force is due to the fact that photons of sunlight possess momentum, and absorbing such a photon or changing its direction causes momentum to be exchanged between the photon and the spacecraft, resulting in a force on the spacecraft. While this force is typically small, it acts continuously, and so its effect can accumulate to cause large changes in a spacecraft's trajectory. Photons emitted by a spacecraft thermal radiation) can have a similar effect, if emitted asymmetrically, as can photons emitted by other bodies, such as sunlight reflected from a planet. The magnitude and direction of this type of radiation force can be estimated by estimating the amount of light impinging on and/or emitted by the spacecraft and modeling the interaction of that light with various surfaces of the spacecraft, taking into account optical properties of those surfaces such as absorptivity and reflectivity. Thus, the acceleration of the spacecraft due to this radiation force can be estimated, and from this, the change in the spacecraft's trajectory due to this force can be estimated. However, all of the parameters involved in estimating this radiation force are uncertain to some extent. As such, the force acting on the spacecraft due to this effect at any given point in time, and the resulting acceleration of the spacecraft, are also somewhat uncertain. This results in some error in the estimate of the change in the spacecraft's trajectory due to this radiation force.

A spacecraft orbiting near or flying closely past a planet with an atmosphere is also subject to atmospheric drag and lift forces. The amount of these forces can be estimated, by employing a model of the atmosphere's composition and density as a function of altitude, and taking into account the spacecraft's altitude, speed, size and shape, along with an estimated drag coefficient. However, several of these parameters are notoriously difficult to estimate accurately, typically resulting in significant errors in the estimate of the drag (and lift) force acting on the spacecraft, and hence in the resulting spacecraft acceleration. This can in turn result in significant errors in estimating the change with time of the spacecraft's trajectory due to these forces.

One force that acts on suitably equipped spacecraft is an artificial force, caused by the operation of a propulsion system aboard the spacecraft. The propulsion system is usually used deliberately, to produce a desired force for a desired period of time, in order to effect a desired change in the spacecraft's trajectory. However, the amount of force that will actually be produced by a spacecraft's propulsion system is not completely predictable, for various reasons. One reason is that manufacturing tolerances will result in a given propulsion system performing slightly differently from another, nominally identical propulsion system, and also performing slightly differently from the performance specified by its designers. Another reason is that wear can cause a propulsion system's performance to change with time. For this reason it is common for a spacecraft's propulsion system to be calibration tested, both on the ground and in space, in order to ascertain its thrust characteristics. However, this calibration testing employs measurements that themselves are subject to some uncertainty, and so the resulting calibrated thrust performance figures retain some residual uncertainty. This results in some uncertainty as to the amount of acceleration that the spacecraft will experience when the propulsion system is operated. This in turn results in error in the estimate of the change in the spacecraft's trajectory as a result of operating the propulsion system.

A related artificial force that can act on a spacecraft is the unintentional force caused by leakage of propellant and/or pressurant gas past valves in a spacecraft's propulsion system. While this force is nominally zero, typically no valve seals perfectly, and a small force can result. If this force acts continually over a long period of time, a significant trajectory error can result.

For systems that use high thrust propulsion, external reference navigation systems/sensors can be used prior to and after a propulsive event, and navigation using inertial sensors can be used during the propulsive event. Inertial sensors respond quickly enough to allow real-time decisions to be made on-board the spacecraft regarding thrust termination. In contrast, external reference navigation systems typically take too long to be used for that, particularly if they involve communications between the spacecraft and Earth, due to speed-of-light time-lag in that communications for spacecraft far from Earth, and the time taken for processing of this navigation data on Earth.

Estimating a spacecraft's trajectory can be improved by making measurements of the spacecraft's non-ballistic acceleration using an accelerometer, and including those measurements to correct the trajectory estimate. As used herein, non-ballistic acceleration refers to acceleration due to all forces other than the force of gravity. If a sufficiently accurate accelerometer is used continuously to measure non-ballistic acceleration after a spacecraft's position and velocity had been determined by means such as radio navigation, then the spacecraft's acceleration with respect to a suitable inertially-fixed reference frame can be determined by adding the accelerometer measurement to an estimate of the gravitational acceleration from all significant gravitating bodies in the Solar system. Then, as described above, the spacecraft's position and velocity can be determined at any future time by integrating the sum of the acceleration due to gravitational forces plus the non-ballistic acceleration to determine the change in velocity, and integrating velocity to find the change in position.

In this method, if the accelerometer were perfectly accurate, then the resulting trajectory estimate would be as accurate as an estimate of a trajectory in which no forces other than gravity were acting on the spacecraft. However, real accelerometers are not perfectly accurate, and different accelerometers exhibit different levels of inaccuracy. If an insufficiently accurate accelerometer is used in this method, in which the inaccuracy in the accelerometer's measurement is larger than the sum total of the uncertainty in all of the non-gravitational forces acting on the spacecraft, then the resulting trajectory estimate will be worse than if the accelerometer measurements had not been used. In this case, one would be better to not make use of accelerometer measurements when estimating the spacecraft's trajectory.

If a sufficiently accurate accelerometer is used, in which the inaccuracy in the accelerometer's measurement is smaller than the sum total of the uncertainty in all of the non-gravitational forces acting on the spacecraft, then the resulting trajectory estimate will be better than if the accelerometer measurements had not been used. In this case, incorporating the accelerometer measurements can result in an improved trajectory estimate. Thus, as used herein, the definition of a "sufficiently accurate accelerometer" depends on the uncertainties in the non-gravitational forces acting on the spacecraft. This, in turn, depends on many factors, and can be significantly different from one case to another.

For example, consider cases in which a spacecraft is equipped with a propulsion system used to manoeuvre the spacecraft and thereby change its trajectory. The uncertainty in the propulsion system's thrust results in an uncertainty in a modeled prediction of the spacecraft's acceleration, which is denoted here as δa. For simplicity in this example, it is assumed that δa is constant, unchanging with time over the course of a manoeuvre. If the manoeuvre involves thrusting in a constant direction for a length of time t, then the uncertainty in the position of the spacecraft in the direction of the thrust at the end of the manoeuvre is denoted here as δx, where:

$$\delta x = \frac{1}{2} * \delta a * t^2$$

If an accelerometer is available with accuracy better than δa, then the uncertainty in the spacecraft's location at the end of the manoeuvre (δx) may be reduced by double-integrating the signal generated by that accelerometer during the manoeuvre, as described above, instead of double-integrating the modeled prediction of the acceleration due to the propulsion system's thrust.

The amount of uncertainty in knowledge of a spacecraft's position that is acceptable varies depending on the mission of the spacecraft. For example, for a spacecraft performing a gravitational swing-by manoeuvre passing very close to a planet such as Mars, navigation accuracy of better than 1 km may be required. For a spacecraft on its way to rendezvous-ing with an asteroid, navigation accuracy using radio tracking from Earth of 10,000 to 100,000 km may suffice, up to the point of switching over to using optical navigation using imaging sensors on the spacecraft. The length of time required to accomplish a propulsive manoeuvre is a function of how much thrust the propulsion system generates, and the total amount of velocity change needed. The inaccuracy in the measured acceleration depends on the characteristics of the instrument such as bias drift.

For example, consider the case of the Apollo spacecraft, which was equipped with a Service Propulsion System (SPS) capable of producing a thrust of 91,000 N. The mass of the Apollo command module plus service module upon arrival at the Moon was approximately 30,000 kg. The SPS could cause the spacecraft to accelerate with an acceleration of about 3 m/s$^2$, depending on the thrust setting and amount of remaining propellant.

In particular, the Apollo 10 mission's first Lunar Orbit Insertion (LOI) "burn" of the SPS lasted 1=356 s, resulting in a change in velocity of 909 m/s, with an average acceleration of 2.55 m/s$^2$. If the thrust of the SPS engine was known to a typical accuracy of 1%, the resulting uncertainty in acceleration would have been δa=0.0255 m/s$^2$; the corresponding uncertainty in velocity would have been 0.0255*356=9 m/s, and the corresponding uncertainty in along-track position by the end of that burn would be 0.5*0.0255*356$^2$=1615 m, if no accelerometer measurements were used.

The Apollo spacecraft was equipped with an inertial navigation system, including three pulsed integrating pendulous accelerometers (MAO. The accuracy of those accelerometers was measured to be 13 micro-g, or 0.00013 m/s$^2$, about 200 times more accurate than the uncertainty posited in the above example. By using these accelerometers, the velocity change during the 356 s LOI manoeuvre could be estimated with an accuracy of 356*0.00013=0.046 m/s, and the along-track motion of the spacecraft during the manoeuvre to within 0.5*0.00013*356$^2$=8.2 m, assuming perfect knowledge of position and velocity at the start of the manoeuvre. (Actually, uncertainties in the estimated position and velocity at the start of the manoeuvre degraded the achieved accuracy somewhat from these values.)

High-thrust propulsion systems consume their propellant relatively quickly so the duration of maneuvers using these systems is typically relatively short, on the order of seconds, minutes or hours. For example, the Apollo 10 first LOT burn lasted nearly 6 minutes. Because the manoeuvre duration is short, the amount of uncertainty in position and velocity that can accumulate during that time is relatively small. For a constant value of thrust and hence acceleration uncertainty, the uncertainty in velocity increases directly with time, and the uncertainty in position increases quadratically with time. Table 1 illustrates this increase in uncertainty for the Apollo 10 SPS, again assuming that the thrust of the SPS engine was known to a typical accuracy of 1%, for hypothetical burns of duration varying from 10 seconds to 15 minutes. (This table assumes thrust in the along-track direction, and ignores variations in acceleration uncertainty as propellant depletes and spacecraft mass decreases.) The uncertainties associated with SPS burns of several minutes' length were larger than the Apollo missions could tolerate, given that the spacecraft was flying only about 100 km above the Lunar surface. The use of accelerometer measurements reduced these uncertainties considerably, to within acceptable bounds.

TABLE 1

| t (s) | δa (m/s$^2$) | δv (m/s) | δx (m) |
|---|---|---|---|
| 10 | 0.0255 | 0.255 | 1.275 |
| 60 | 0.0255 | 1.53 | 45.9 |
| 300 | 0.0255 | 7.65 | 1147.5 |
| 900 | 0.0255 | 22.95 | 10327.5 |

However, low-thrust propulsion systems produce low accelerations, and in many missions must operate for much longer periods of time to create the amount of velocity change needed to produce the desired trajectory change. For example, low-thrust propulsion systems may operate for periods of prolonged duration, e.g. on the order of days, weeks or months. Also, low-thrust propulsion systems are typically used for spacecraft whose total amount of velocity change is very large; in particular low-thrust propulsion systems that can operate with a higher specific impulse than higher-thrust propulsion systems, which are more efficient in terms of propellant expenditure than high-thrust propulsion systems, an advantage which increases exponentially as velocity change increases. This larger Δv also acts to make thrust durations longer, and longer thrust duration provides more time in which uncertainty in velocity and position change can grow due to thrust uncertainty.

For example, the Dawn spacecraft, whose mission was to rendezvous with the asteroids Vesta and Ceres, operated its ion thrusters for 46 months to traverse from the vicinity of Earth to Vesta, and for a further 30 months to travel from Vesta to Ceres, accomplishing a total velocity change in excess of 10,000 m/s. In doing so, its velocity change was much larger than the 909 m/s ΔV achieved by Apollo 10 during its LON manoeuvre. The thrusters produce a thrust of 0.09 N, which accelerated the approximately 1000 kg spacecraft at about 0.00009 m/s$^2$ (9 micro-g). (These are approximate values only; as the mission proceeded and propellant was depleted, the spacecraft's mass dropped from its initial value of 1240 kg; and so the actual acceleration varied with time.)

Because of this, the amount of uncertainty in such a spacecraft's position and velocity can grow to much larger values. Using the example of Dawn, if it is assumed that its thrust value was known to 1% (the same assumed for the Apollo 10 example above), this would result in an acceleration uncertainty of about 0.09 micro-g; or $9 \times 10^{-7}$ m/s². Table 2 illustrates the uncertainty in velocity and position that would accumulate over periods of time ranging from one day to 500 days (about 16.7 months), if no navigation measurements were made after the beginning of maneuvers of those lengths. (This table again assumes thrust in the along-track direction, and ignores variations in acceleration uncertainty as propellant depletes and spacecraft mass decreases.)

TABLE 2

| t (days) | t (s) | δa (m/s²) | δv (m/s) | δx (m) | δx (km) |
|---|---|---|---|---|---|
| 1 | 86400 | $9 \times 10^{-7}$ | 0.078 | 3,359 | 3.359 |
| 10 | $8.64 \times 10^5$ | $9 \times 10^{-7}$ | 0.78 | | 335.9 |
| 100 | $8.64 \times 10^6$ | $9 \times 10^{-7}$ | 7.8 | | 33,592 |
| 500 | $4.32 \times 10^7$ | $9 \times 10^{-7}$ | 39 | | 839,800 |

Given the long duration of such manoeuvres, the errors in estimated position and velocity eventually grow enormously. After 100 days, the error of about 34,000 km would be large enough to jeopardize successful rendezvous with a target asteroid. For this reason, the Dawn mission uses DSN radio navigation to determine the spacecraft's position and velocity, typically carrying out one DSN tracking session per week.

Consider the possibility of using accelerometers aboard such a spacecraft to carry out inertial navigation. For example, consider accelerometers with the same accuracy of the Apollo PIPA accelerometers, 13 micro-g, which is about 0.00013 m/s². While this was calculated above to be about 196 times more accurate than a 1% uncertainty in the Apollo SPS thrust level, it is about 142 times less accurate than a 1% uncertainty in Dawn's ion thrust level. Thus, the Apollo PIPA accelerometers would have been far too inaccurate to be able to improve the accuracy of Dawn's trajectory in-between DSN tracking sessions.

Most other accelerometers are no better. For example, the Honeywell Q-Flex® QA-3000 accelerometer is widely recognized as being one of the most accurate navigation-grade accelerometers available. However, its signal contains a bias term which is unpredictable by as much as 40 micro-g, or 0.0004 m/s², over long time-scales, such as periods of prolonged acceleration. Again, this is much too large an error to be useful in improving trajectory estimates for such a low-thrust mission, as it is four times higher than the actual thrust being produced, and 400 times higher than the estimated 1% uncertainty in that thrust.

In order for an accelerometer to be useful in this regime, then, its inaccuracy must be less than the uncertainty in the thrust. In this example case, where a 1% uncertainty in thrust is equal to about 0.09 micro-g, or $9 \times 10^{-7}$ m/s², an accelerometer accuracy of approximately 10 times better than this, or $9 \times 10^{-8}$ m/s² (about 10 nano-g, where 1 g is about 9.8 m/s²) would be needed to provide a significant improvement in navigation certainty. One such accelerometer, capable of this level of performance, here called a VEGA type accelerometer, is described in U.S. patent application Ser. No. 14/672,808, entitled "Absolute Vector Gravimeter and Methods of Measuring an Absolute Gravity Vector" filed Mar. 30, 2015, the entirety of which is incorporated herein by reference. A VEGA type accelerometer is capable of this level of performance, with an accuracy of 1-10 nano-g.

A VEGA type accelerometer functions as an inertial navigation sensing device by rotating an accelerometer through at least two different positions and using the set of measurements to calculate the instrument bias and a corrected acceleration measurement. The simplest form of this is to alternately point a single axis accelerometer in the positive thrust direction and the negative thrust direction then use the resulting measured pair of values to estimate the instantaneous bias in the instrument and remove it from the measured acceleration. More complex implementations can include making measurements that are not 180 degrees apart, making measurements in more than two directions and making measurements while rotating the accelerometer continuously. Larger numbers of repeated measurements along an axis can improve accuracy along that axis. Measurements along several axes can yield knowledge of the acceleration of the spacecraft along those axes providing a more complete picture of the forces acting on the spacecraft. The VEGA type accelerometer is thus suited to making accurate measurements of a constant or slowly changing acceleration for prolonged periods, such as that experienced by a maneuvering low thrust spacecraft.

FIGS. 1A and 1B show schematic representations of two embodiments of a VEGA type accelerometer, 100a and 100b respectively, with a single-axis accelerometer mounted on a single-axis gimbal. The single-axis gimbal is mounted on a base (not shown). Those skilled in the art will appreciate that the base can be any member suitable for supporting the single-axis gimbal in the intended application. In FIG. 1A, single-axis accelerometer 110 is mounted to single-axis gimbal 112a with a 180 degree range of motion. In FIG. 1B, single-axis accelerometer 110 is mounted to single-axis gimbal 112b with a 360 degree range of motion. The mounting of single-axis accelerometer 110 on single-axis gimbal 112a, 112b allows the sensitive axis of single-axis accelerometer 110 to be pointed in opposite directions along one co-ordinate axis. For example, single-axis gimbal 112a, 112.b is capable of pointing single-axis accelerometer 110 in the positive z direction and the negative z direction, as shown. In both cases, single-axis accelerometer 110 can be operationally connected to a processor (not shown) for processing the output of single-axis accelerometer 110 as described below.

It should be noted that the VEGA type accelerometer described here measures a non-ballistic acceleration. For example, a VEGA type accelerometer 100 in free-fall would measure zero because it would be following a ballistic trajectory, while the same VEGA type accelerometer 100 sitting on the surface of the Earth would measure the surface gravity at that location (with additional small contributions from the planet's rotation and gravitational effects from other small and/or distant bodies) because, being motionless on the surface, its actual acceleration is equal to the negative of the ballistic acceleration at that location. The same VEGA type accelerometer located in a spacecraft in flight while being accelerated by a propulsion system would measure the acceleration imparted by the operation of the propulsion system.

Single-axis accelerometer 110 can be any suitable device chosen for its desired sensitivity and ability to operate effectively in the environment in which it is expected to be used. For example, it has been found that a Q-Flex® QA2000, by Honeywell provides good sensitivity and is expected to be able to perform adequately in terrestrial and space applications.

Single-axis gimbal 112a, 112b can be any mechanical gimbal chosen for its ability to operate under expected environmental conditions provided that it is capable of repeatedly stewing through a selected angle and holding single axis accelerometer 110 steady while measurements are taken. Although the embodiments described herein are operable when the selected angle is as small as 60 degrees or less, it has been found that the best performance is obtained when the selected angle is at least 180 degrees. More complex modelling may be required for angles other than 180 degrees and will be discussed below in reference to FIG. 5. Accordingly, it is preferred that single axis gimbal 112a, 112b is capable of repeatedly slewing through at least 180 degrees and maintaining single-axis accelerometer 110 aligned with the measurement axis in each of two opposite directions for the duration of each measurement.

Processor (not shown) can be any suitable device for carrying out the required calculations and issuing the required commands, as described below. The processor can be a dedicated hardware device, such as a computer chip, or it may be a software implementation on a general purpose computer. The processor can be a single unit located in proximity to the base of the instrument or be implemented in a distributed system with components in different locations connected via a network or other means for communicating measurements. For example, the component of the processor "on board" may function only for data gathering and controlling the instrument while the raw signal is transmitted elsewhere for additional post processing and analysis. In another example, the measurement data may be collected locally and stored on a storage medium (such as a DVD or a flash drive), and then transported to another computer. Such an example implementation may be utilized in a lab testing or terrestrial surveying application.

In the example of a spacecraft, the on-board processor can be configured to analyze the data captured by an accelerometer without requiring transmission to a remote device for further post-processing and analysis. That is, the on-board processor may be configured to enable inertial navigation of the spacecraft using acceleration measurement signals generated by the accelerometer to determine changes in the velocity and position of the spacecraft over time. Thus, inertial navigation of the spacecraft may be performed without requiring external processing (and the costs associated with transmission to a remote processing unit) and may be performed without an external point of reference, and the additional equipment and processing difficulties associated therewith.

A simpler example of the VEGA type accelerometer will be described first while a discussion of a more complex example of the VEGA type accelerometer can be found below. In the simpler example of the VEGA type accelerometer; one operational measurement cycle comprises:

Slew the gimbal to align the single-axis accelerometer with a chosen positive measurement axis, for example the axis direction in FIG. 1A;

Measure the accelerometer's signal while pointed in that first direction;

Slew the gimbal 180 degrees to align the single-axis accelerometer with the negative measurement axis, for example the −z axis direction in FIG. 1A; and Measure the accelerometer's signal while pointed in that second direction;

Estimate bias by adding the above two measurements and dividing by two;

Estimate a corrected acceleration measurement along the positive measurement axis by subtracting the second measurement from the first measurement and dividing that difference by two;

Each measurement cycle generates a measurement pair consisting of one measurement along each of the chosen positive and negative measurement axes. A single measurement pair is sufficient to estimate the current value of the bias of single-axis accelerometer 110 and correct the measured value of the component of the acceleration along the measurement axis to a degree of accuracy limited by the rate of drift of the bias and the white noise in the system. In particular, the first measurement includes the current value of the accelerometer bias plus the component of the acceleration in the first direction (the positive measurement axis), plus an error due to noise; while the second measurement includes the accelerometer bias minus the component of the acceleration in the first direction (the positive measurement axis), plus a (different) error due to noise. Thus one-half of the sum of the two measurements is equal to the accelerometer's bias (plus effects due to noise), while one-half of the difference between the two measurements is equal to the component of the acceleration along the measurement axis (plus effects due to noise) More generally, the component of acceleration along an axis of determination (where the axis of determination is a direction along which a component of the acceleration will be estimated) can be estimated by making two measurements, the first at a gimbal angle (90−θ) degrees from the axis of determination, where θ is some angle greater than zero degrees, and the second at a gimbal angle (90+θ) degrees from the axis of determination, then subtracting the second measurement from the first measurement, then dividing that difference by the two times the sine of θ; with only 2 measurements, however, the value of the bias can only be independently determined if θ=90 degrees (corresponding to the simplest example). Within a single measurement cycle, longer measurement times in each orientation will help to limit the effect of "white noise" on the measurement but at the cost of increasing errors due to bias drift while shorter measurement times will help to limit the errors due to bias drift but at the cost of increasing the root mean square (RMS) value of the error due to white noise.

This approach has the effect of measuring one component of the acceleration, projected onto a reference frame that is fixed with respect to the instrument's base. This approach does not require that the instrument-fixed reference frame be aligned to have one of its axes parallel to the direction of the acceleration.

Figure 2:
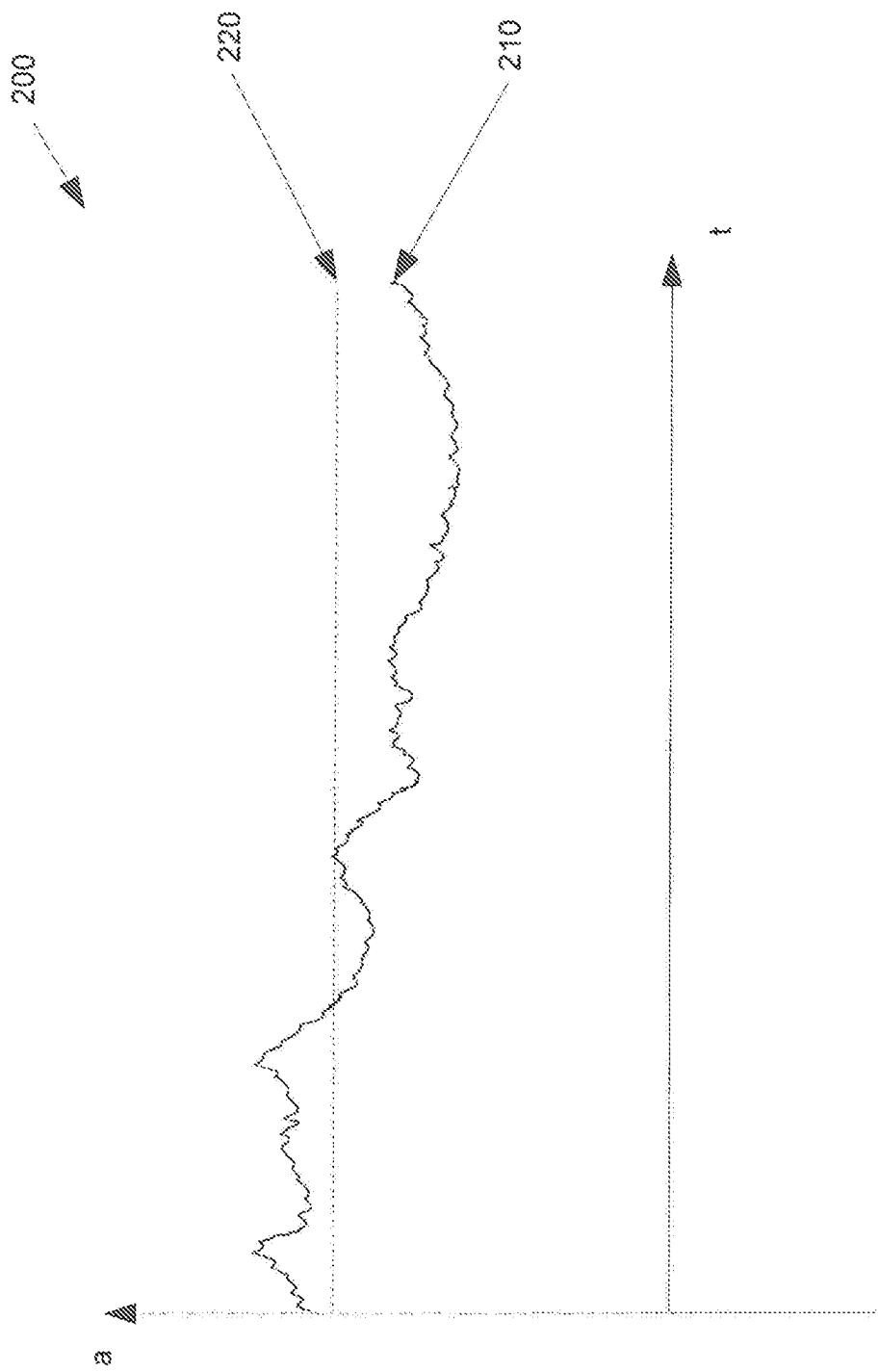
FIG. 2 is a graph of an example output signal of an accelerometer in the time domain.

FIG. 2 is a graph 200 representative of a typical output signal of an accelerometer in the time domain. The output signal 210 can be thought of as comprising three components: the true value of the acceleration's projection along the axis of measurement as well as a "white noise" component, that is essentially independent of frequency, and a "red noise" component (sometimes also known as "coloured noise") that is frequency dependent. The true value is shown by the dashed line 220 and here is shown as being constant over the measurement interval. The red noise component is due mainly to the drifting bias of single-axis accelerometer 110 and is seen as the long wavelength change over time. The white noise component is seen as random, short wavelength variations.

Figure 3:
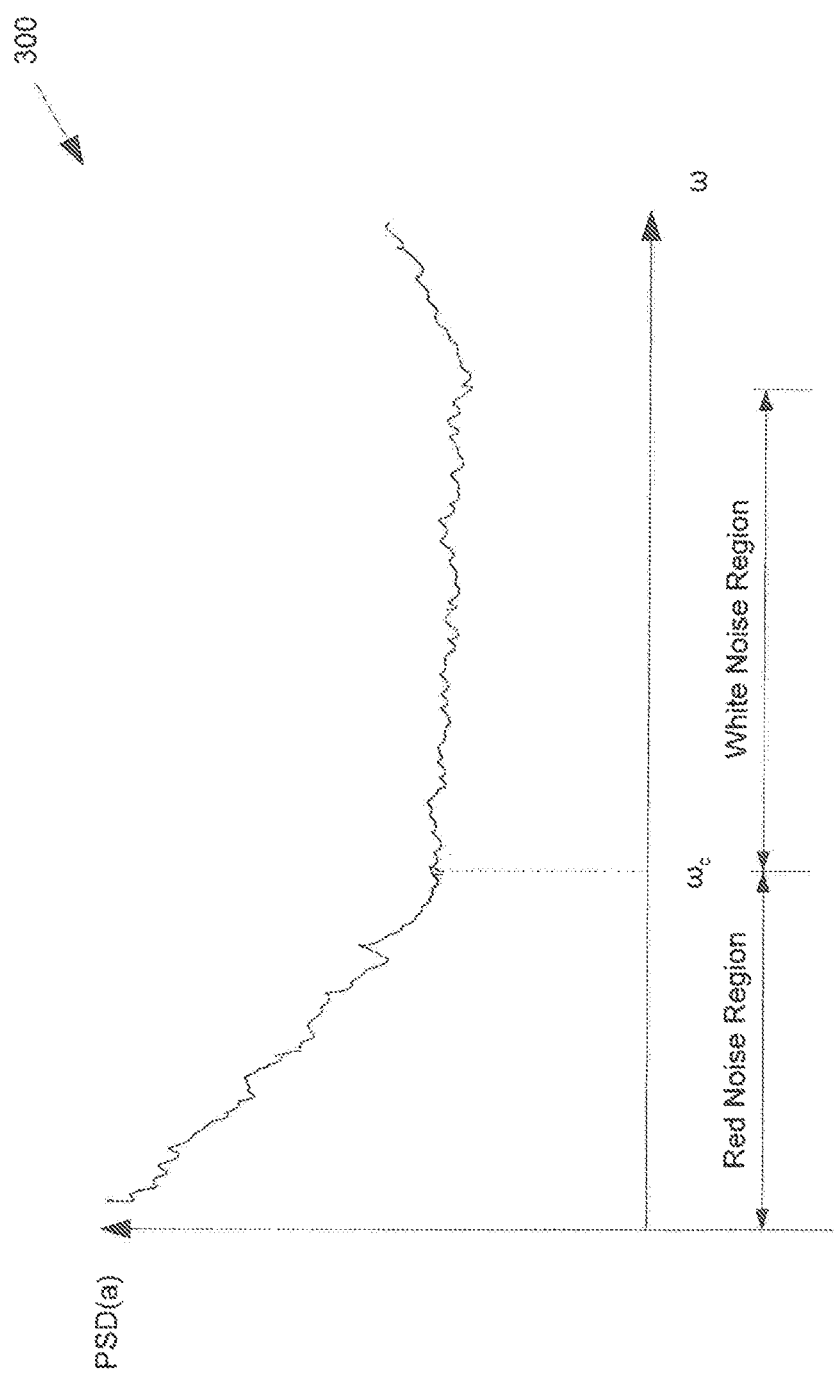
FIG. 3 is an example power spectral density graph of an example output signal of an accelerometer in the frequency domain.

FIG. 3 shows a graph 300 that is representative of the power spectral density (PSD) of the output of the same accelerometer in the frequency domain. The graph contains a red noise region to the left and a white noise region in the centre with a transition that occurs at a cut-off frequency, $\omega_c$. In the red noise region, the drifting bias in single-axis accelerometer 110 is the dominant form of noise, resulting in an increase in the error as frequency decreases. In the white noise region smaller random variations that do not contribute to drifting bias are the dominant form of noise. As the duration of a measurement increases and approaches $t_c=1/\omega_c$, errors due to the drifting bias begin to dominate over errors due to the white noise. Instruments are designed to operate within the white noise region where the noise in the signal is most easily quantifiable and $t_c$ represents an approximate cap on the length of a single useful measurement.

If an accelerometer were hypothetically to exhibit only white noise, and to not exhibit red noise, and assuming that the acceleration signal being measured was not changing with time, then the RMS error in the measured acceleration could be made as small as one desires—i.e., the acceleration measurement could be made as accurate as one desires—by increasing the length of time over which the measurement is taken, and decreasing the bandwidth of a low-pass filter used to process the measurement. Alternately, the same could be accomplished by taking an increasingly large number of brief measurements, each of which has a larger RMS error than desired, then averaging these measurements together, with the RMS error of the averaged measurement decreasing with the square-root of the number of measurements. However, the presence of red noise interferes with the achievement of this objective, having the effect of causing errors which can be relatively large when long, low-frequency measurements are made, or when a large number of brief measurements are made over a long period of time, typically a period of time longer than $t_c$. Thus the presence of red noise in the accelerometer measurement makes impedes improvement of the accuracy of an accelerometer's measurement below some level.

To overcome this difficulty, the VEGA type accelerometer can carry out at least two measurement cycles, and in some cases many more than two. Carrying out multiple measurement cycles allows each individual measurement to be of a short duration to limit the effect of bias drift, but compensates for the increased errors due to white noise on any single measurement by carrying out multiple measurement cycles. Synchronous demodulation of multiple measurement pairs collected over multiple measurement cycles in this way yields an estimate of the acceleration along the measurement axis where the error in the estimate is dominated by white noise, rather than by drifting bias. As such, the error in this measurement can be made arbitrarily small (i.e. the accuracy of the accelerometer can be increased), for unchanging or slowly-changing accelerations, by increasing the number of measurement cycles and filtering the output signal to a lower bandwidth.

For example, if t is the length of one static measurement and n is the number of measurement cycles then (neglecting for the moment the time taken to slew between measurement orientations) T=2nt is the total measurement time and the lowest bandwidth to which the output can be filtered is approximately 1/T. As used herein, "static measurement" means a signal measured from the accelerometer when the gimbal is not rotating relative to the base. Since the RMS error is dominated by white noise, it will vary with the inverse square root of T, and so the RMS error can be made smaller by increasing the number of measurement cycles, n:

$$\text{RMS Noise} \sim \frac{1}{\sqrt{T}} = \frac{1}{\sqrt{2nt}}$$

It has been found that results are better when the accelerometer is operated at a measurement cycle frequency, $\omega=1/2t$, which is significantly greater than the cut-off frequency, $\omega_c$, such as $\omega \geq 2\omega_c$. Accordingly, the number of cycles for a desired amount of RMS noise can be calculated. (Similar results hold true when the time taken to slew between measurement orientations is taken into account.)

The cut-off frequency also constrains the design of gimbal 112, and more specifically the slew rate of gimbal 112. The VEGA type accelerometer should be able to complete one measurement cycle before the bias wanders far enough to introduce a significant amount of error in the measurements. Accordingly, gimbal 112 can be chosen so that the amount of time per cycle spent slewing is small compared to $t_c=1/\omega_c$, otherwise there may not be time to complete both measurements before the bias has drifted too far. Preferably, the amount of time per cycle spent slewing is less than half of $t_c$.

Accordingly, a preferred method of measuring the projection of the acceleration along a measurement axis comprises:
  a. Slew to align single-axis accelerometer with the positive measurement axis, for example the +z axis direction in FIG. 1A;
  b. Measure the accelerometer's signal while pointed in that first direction;
  c. Slew to align single-axis accelerometer with the negative measurement axis, for example the −z axis direction in FIG. 1A;
  d. Measure the accelerometer's signal while pointed in that second direction;
  e. Estimate bias for this cycle by adding the above two measurements and dividing by two;
  f. Estimate acceleration along the positive measurement axis for this cycle subtracting the above two measurements and dividing by two;
  g. Repeat steps a-f a number of times corresponding to a desired RMS error, and
  h. Calculate an overall estimate of the component of acceleration along the positive measurement axis by averaging the estimated acceleration from all of these cycles.

Additional components of the acceleration can be measured by taking static measurements at additional points along the range of single axis gimbal 112. For example, in order to measure the acceleration along the x-axis using the VEGA type accelerometer Mb as shown in FIG. 1B; single axis accelerometer 110 can be oriented along the positive and negative x-axes and the same calculation can be carried out.

In another embodiment, the VEGA type accelerometer of FIG. 1A can also be used to estimate the acceleration along the x-axis by measuring once along the positive x-axis and using the bias estimate from the most recent opposed measurements along the z-axis to correct the value. In particular, such a measurement includes the accelerometer bias plus the component of the acceleration in the +x axis direction, plus an error due to noise; subtracting the previously-determined value of the bias from this produces a value equal to the component of the acceleration in the +x axis direction (plus effects due to noise). In this case; one measurement cycle comprises:

Slew to align single-axis accelerometer with a first positive measurement axis, for example the +z axis direction in FIG. 1A;

Measure the accelerometer's signal while pointed in that first direction;

Slew to align single-axis accelerometer with the negative measurement axis, for example the −z axis direction in FIG. 1A;

Measure the accelerometer's signal while pointed in that second direction;

Estimate bias by adding the above two measurements and dividing by two;

Estimate acceleration along the first positive measurement axis by subtracting the above two measurements and dividing by two;

Slew to align single-axis accelerometer with a second positive measurement axis that is perpendicular to the first positive measurement axis, for example the +x axis direction in FIG. 1A;

Measure the accelerometer's signal while pointed in that third direction, and

Estimate acceleration along the second positive measurement axis by subtracting the bias estimate from that third measurement.

It will be appreciated that the order in which these steps are performed may vary and that repeating the measurements 2 or more times will again lead to a reduction in the RMS error, when the acceleration being measured is unchanging or is changing slowly. Also, improvements may be possible in some cases by also conducting similar operations, such as making measurements in both the positive and negative x directions and using those to update the accelerometer bias measurement.

In another embodiment, two single axis accelerometers can be mounted each on a separate single axis gimbal, with the two gimbals oriented so that their gimbal axes are orthogonal to each other. This will allow the calculation of all three components of the acceleration vector by applying the preceding method to each of the x, y and z axes. For example, a first unit may take measurements along the x and z axes while a second unit takes measurements along the y and z axes. Note that the second unit may be operated such that it provides a redundant estimate of the acceleration along one of the same measurement axes provided by the first unit (i.e. in the preceding example the z axis is measured by both units). Such redundancy may be used to check calibrations between units or combined to get a more accurate measurement along one axis.

In this embodiment, where 3 orthogonal components of the acceleration in an instrument-fixed reference frame have been determined, then that acceleration vector has been completely determined. In which case, the magnitude of the acceleration can also be calculated; it is equal to the RMS value (i.e., the square root of the sum of the squares) of the 3 orthogonal acceleration components.

In another embodiment, a single-axis accelerometer can be mounted on a two-axis gimbal and sequentially moved through orientations along all three axes to calculate all three spatial components of the acceleration. As with the previous embodiments, these measurements can be made in directions aligned with an instrument-fixed reference frame, which need not be aligned to have one of its axes parallel to the along-track direction.

In another embodiment, single axis gimbal 112 may be configured to orient single axis accelerometer 110 in directions other than directly along orthogonal axes. For example, it is possible to derive a de-biased estimate of the acceleration along the z-axis and the x-axis by taking measurements at zero degrees, 120 degrees and 240 degrees from the positive z-axis in the xz-plane. These 3 measurements are referred to below as m1, m2 and m3, respectively. Each measurement comprises the bias plus the cosine of the measurement angle multiplied by the +z component of acceleration plus the sine of the measurement angle multiplied by the +x component of acceleration. It can then be shown that in this particular case the accelerometer bias can be estimated using the formula $(m1+m2+m3)/2$, the +x component of the acceleration can be estimated using the formula $(m2-m3)/\sqrt{3}$, and the +z component of the acceleration can be estimated using the formula $(m1-m2-m3)/2$. This is also possible by taking 3 measurements in 3 other directions, or by taking more than 3 measurements each in a different direction, in which case the mathematics of determining the accelerometer bias and the acceleration components in the +z and +x directions is more complex, and generally is better approached by fitting the measurements to a signal model including a sinusoidal term, as discussed below. Two such single-axis gimbal units oriented so that their rotation axes are orthogonal may therefore be able to provide de-biased estimates of all three vector components of the acceleration.

The data acquisition electronics, i.e. the processor, can be located on the base of the VEGA type accelerometer and connected to the accelerometer(s) via a hard-wired connection, such as a cable wrap drum. Alternatives to passing power and data via a hard-wired connection are possible, but can introduce undesirable effects. For example, passing power and data through slip rings introduces measurement noise. For another example, passing power and data via completely wireless means necessitates locating the data acquisition electronics on the rotating stage, which constrains the size and type of those electronics and may introduce difficulties in controlling the temperature of those electronics, which in turn can increase measurement errors. Since it is possible to slew to any orientation of single axis accelerometer 110 within a 360 degree envelope and gimbals 112a, 112b do not need to perform more than one complete rotation, a set of wires that winds and unwinds as the gimbal(s) slew is the preferred connection; however, any such method for passing power and data could potentially be used.

Figure 4:
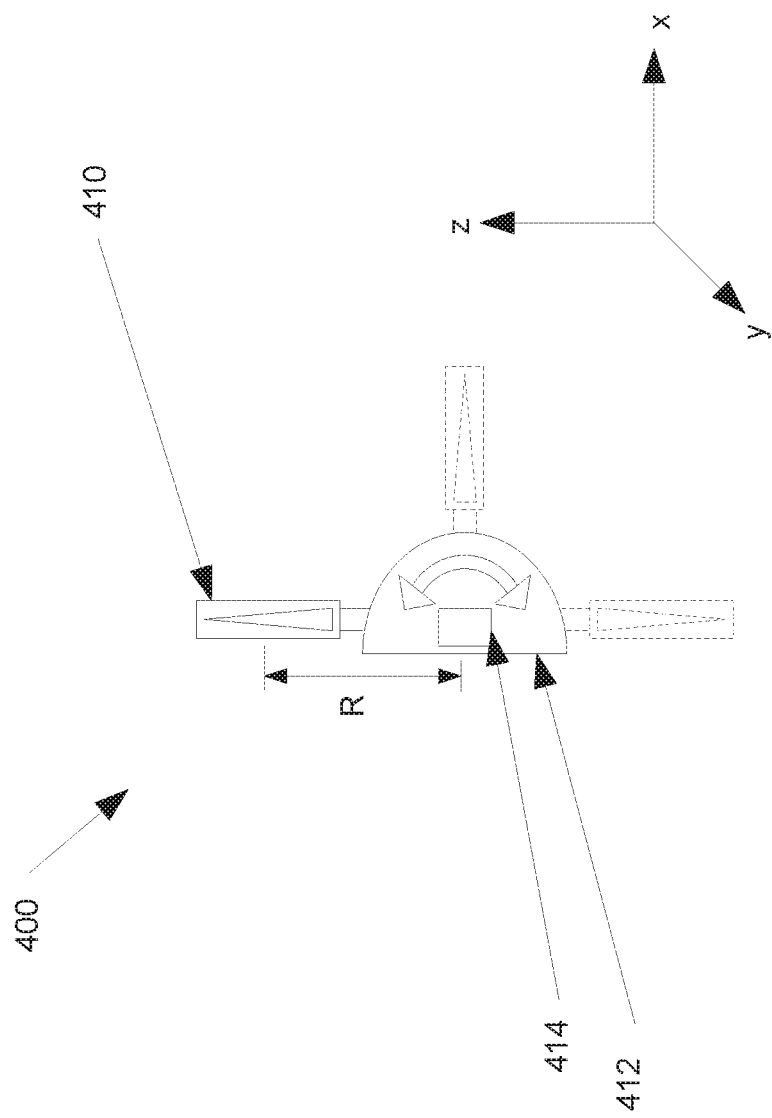
FIG. 4 shows a schematic representation of another example of a single axis accelerometer mounted on a single axis gimbal incorporating an angle sensor.

FIG. 4 shows a schematic representation of another embodiment of a VEGA type accelerometer 400 with a single axis accelerometer mounted on a single axis gimbal incorporating an angle sensor 414. This embodiment is similar to that shown in FIG. 1A including a single axis accelerometer 410 mounted on a single axis gimbal 412. In addition, an angle sensor 414 is used to measure the angular position of single axis accelerometer 412 when stationary and while slewing. Angle sensor 414 can also be configured to measure the angular speed, or slew rate, of single axis accelerometer 410 directly. Those skilled in the art will appreciate that, in an alternative embodiment, multiple angle sensors may be provided, such as one sensor that measures angle and another sensor that measures angular rate.

In this embodiment, single axis accelerometer 410 takes measurements not only while stationary, but also while slewing, preferably but not necessarily at a constant angular speed, the total range of angular motion during such a slew potentially being limited by the constraints imposed by a hard-wired connection between the accelerometer and the processor. Such measurements will include a centripetal acceleration component. If the physical characteristics of the instrument are well known, for example, they can be measured accurately during manufacture, then the measured angular position and/or rate information can be combined with the known geometry to calculate an expected centripetal acceleration. Comparing the measured signal containing the centripetal acceleration component with the expected centripetal acceleration signal yields information about the end-to-end gain in the measurement system. This information can be used to correct acceleration values derived from the static measurements.

In particular, key geometric characteristics of the instrument can be predetermined. For example, a mathematical model of accelerometer 410 can be developed before deployment of VEGA type accelerometer 400 such that its physical characteristics are well known. For example, the distance R between the gimbal's axis of rotation and the accelerometer's centre of measurement can be measured. The distance R is an important geometric characteristic because centripetal acceleration a depends on R in accordance with the formula: $a_c = R\omega^2$, where $\omega$ is the angular velocity of the rotating gimbal. The change in R with temperature can also be measured. VEGA type accelerometer 400 will generally have a small, but repeatable error that depends on gimbal 412 angle. This could be due to many factors, including bearing imperfections and inaccuracy in angle sensor 414. This may be included in the instrument model (described in detail below) in order to improve the overall gain calibration.

For example, once a set of static measurements is complete they can be fitted to a sinusoidal signal model to estimate the acceleration and the residual error as a function of angle. Afterwards, when processing the slew measurements, the acceleration as a function of angle information is subtracted, removing the components due to the acceleration and the angular error terms leaving the centripetal acceleration signal and the bias. This makes estimating the centripetal acceleration more accurate and results in a better end-to-end gain calibration.

Figure 5A:
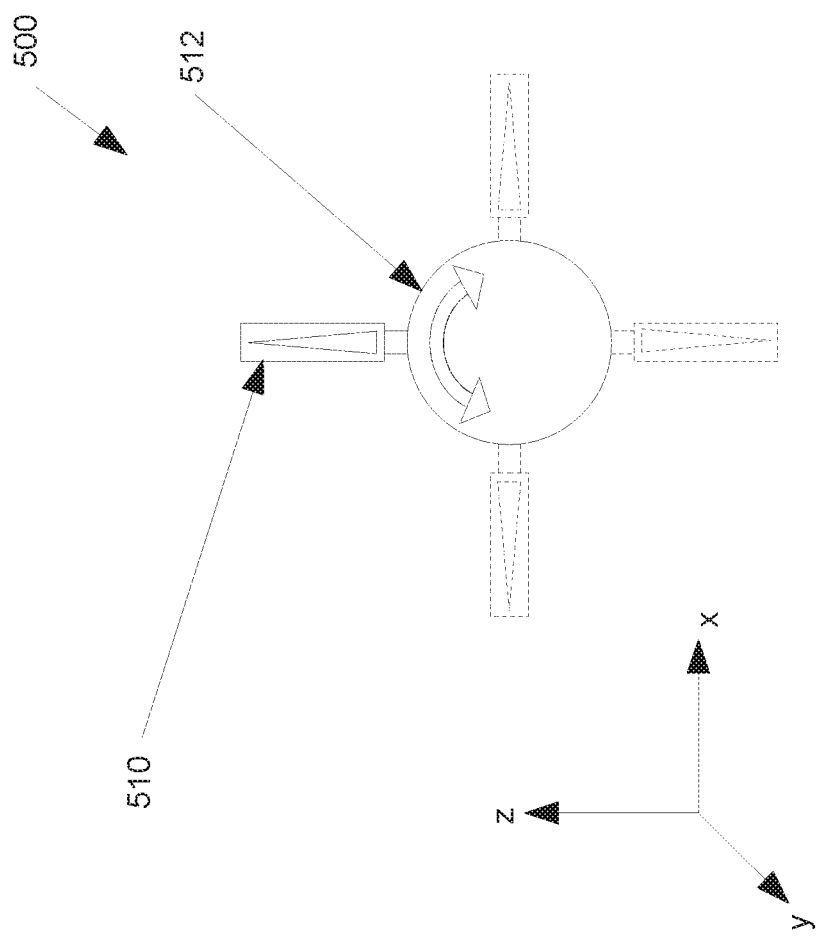
FIG. 5A shows a schematic representation of another example of a single axis accelerometer mounted on a single axis gimbal.
Figure 5B:
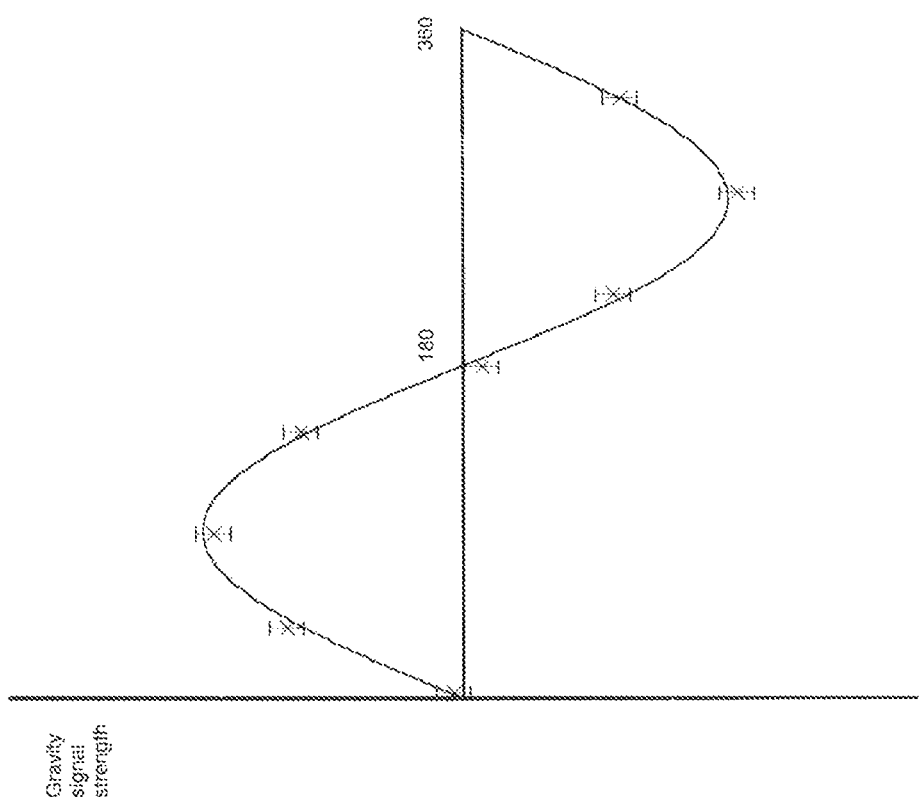
FIG. 5B shows a plot of an acceleration signal v. measurement angle.

FIG. 5A shows a schematic representation of another embodiment of a VEGA type accelerometer 500 incorporating a single axis accelerometer 510 and 360 degree single axis gimbal 512. In this embodiment, finding corrected acceleration measurements is accomplished by model fitting. For example, gimbal 512 may move accelerometer 510 to point towards different static directions around a circle in the x-z plane, where a series of measurements is taken resulting in a series of measured values for acceleration. For example, if the acceleration is aligned with the z-axis then the real acceleration signal will vary sinusoidally with the angle of accelerometer 510 as shown in the solid line of FIG. 5B. If measurements are taken at several orientations in the 360 degree range of gimbal 512 and the results are plotted on the same graph it would appear as the points, including error bars, shown on FIG. 5B. In this example, 8 measurements are shown, but this embodiment will produce a result with as few as 3 measurements. The orientations for those measurements need not be evenly spaced. The measurements may all be within as little as 60 degrees or less of one another, although performance will improve with greater angular separation. Accordingly, a gimbal 512 capable of less than 360 degrees of rotation can be used. A similar result, including a sinusoidal component to the measured signal, may be obtained if the acceleration is aligned in any other direction.

A model of the instrument can be developed that predicts an expected acceleration curve given certain parameters and the measurement data can be fitted to it. Useful parameters have been found to include the tilt angle of gimbal 512 with respect to the acceleration vector, and misalignment of the sensitive axis of accelerometer 510 with respect to the axis of gimbal 512. The number of measurements here functions much as the number of measurements does as described above: a greater number of measurements reduces the contribution of white noise in the same manner as described above, $$\text{RMS Noise} \sim \frac{1}{\sqrt{n}}$$

In addition, the same speed constraints apply. The more quickly the entire set of measurements can be made, the less the bias will have drifted during the measurements and the more accurate the corrected measured components of the acceleration will be.

One single axis gimbal 512 with one single axis accelerometer 510 can be used to measure the components of the acceleration in two directions, e.g. x and z, as well as the bias in the single axis accelerometer 512. As above, placing a second VEGA type accelerometer 500 oriented orthogonally to the first correspondingly allows measurement of the complete acceleration vector as well as correcting for the bias in both single axis accelerometers 512.

The above description assumes that the signal generated by the rotatable accelerometer (e.g. the VEGA-type accelerometer) primarily includes an acceleration term proportional to a component of the non-ballistic acceleration of the accelerometer, plus an error term which primarily includes high-frequency white noise with a slowly-varying bias. If the spacecraft upon which the rotatable accelerometer is mounted is itself rotating, this spacecraft rotation may affect the signal generated by the rotatable accelerometer.

If the distance between the spacecraft's centre of rotation and the rotatable accelerometer is denoted r, and the instantaneous angular velocity of the spacecraft about that centre of rotation is denoted $\omega$, then the accelerometer will undergo a centripetal acceleration of magnitude $r\omega^2$ with respect to an inertial reference frame. If the value of $\omega$ is changing with respect to time (i.e. the instantaneous angular velocity of the spacecraft is changing) the rotatable accelerometer will experience an additional acceleration of magnitude $rd(\omega)/dt$ with respect to an inertial reference frame, proportional to the spacecraft's angular acceleration. Both of these accelerations may affect the signal measured by the rotatable accelerometer, depending on the direction in which that accelerometer is pointed at the time.

If the spacecraft's angular velocity and/or angular acceleration are sufficiently large, the resulting acceleration experienced by the rotatable accelerometer may affect the accuracy of the inertial navigation method described above. To reduce the impact of the error introduced by the spacecraft's angular velocity and/or angular acceleration, active control of the spacecraft's orientation may be used. Spacecraft attitude control is a well-established field, and there are a number of known methods for controlling a spacecraft's orientation. For example, the spacecraft may be equipped with sensors to measure the spacecraft's attitude (such as a star tracker), and/or its attitude rates (such as fiber optic gyros, or MEMS angular rate sensors). The signals from such sensors may be input to a feedback control system aboard the spacecraft, which issues commands to attitude actuators (such as reaction wheels) in such a way that the spacecraft's attitude is held nearly constant with respect to an inertial reference frame. By such means the magnitude of the spacecraft's angular velocity and angular acceleration may be minimized so as not to unduly affect the accuracy of the inertial navigation method described above. To further extend this example, the spacecraft's attitude control system could command the spacecraft's orientation to follow a very slowly-changing attitude set-point, to minimize centripetal accelerations at the rotatable accelerometer. Thus the spacecraft could still perform attitude manoeuvres, which may be required for the spacecraft's mission, while ensuring that the above inertial navigation method provides a desired level of accuracy.

In some cases it may not be possible, or may not be desirable, to confine a spacecraft's angular velocity and/or angular acceleration to low levels throughout the mission. In such cases, another approach to reducing the errors due to the resulting accelerations would be to estimate their effects on the measurements made by the rotatable accelerometer (i.e. an estimated signal due to the spacecraft's angular velocity and/or angular acceleration). This estimated signal could be subtracted from the rotatable accelerometer's total signal, prior to proceeding with the above inertial navigation method. Many suitable methods have been developed in the spacecraft attitude estimation portion of the field of spacecraft attitude control that could be implemented as part of this error minimization technique. For example, the spacecraft may be equipped with attitude sensors such as those mentioned above (e.g. a star tracker, angular rate sensors), and the signals from such sensors can be input to a spacecraft attitude estimator. The spacecraft attitude estimator may be generated, e.g. by modelling the effects of angular velocities and angular accelerations on the spacecraft, taking into account various parameters such as the spacecraft's geometry, and may involve calibration tests, either before launch on Earth or in space, to calibrate the parameters of the model.

The spacecraft attitude estimator may be implemented, e.g. using software stored in memory and operating on an on-board processor which implements a kalman filter algorithm. Such an algorithm may combine the signals from the attitude sensors to ascertain optimal estimates of the spacecraft's attitude and attitude rates with respect to time. These estimates can in turn be used to estimate the components of acceleration at the rotatable accelerometer that are due to the spacecraft's angular motion. Those estimated accelerations can then be subtracted from the accelerometer's measured signal, prior to using that signal for inertial navigation as described above. Such methods may also take into account the accelerometer's location within the spacecraft, and its orientation with respect to time. Various other techniques may also be implemented for reducing accelerometer measurement errors due to spacecraft attitude motion.

As mentioned above, examples of the VEGA type accelerometers described herein are capable of accuracy of 1-10 nano-g. The VEGA type accelerometer is described here only to illustrate one way to achieve the goal of inertial navigation of low-thrust spacecraft; other types of accelerometers might also be capable of achieving a level of accuracy useful for achieving that goal, and the invention described herein includes the use of any such other accelerometer. For example, while the VEGA type accelerometer described above is intended to make static acceleration measurements primarily while its gimbal is held in a constant position, a similar type of rotatable-accelerometer instrument could be used in which the acceleration measurements are made while its gimbal is rotating, for example at a constant rotational speed. The bias in the rotatable accelerometer and the de-biased value of at least one component of acceleration may be estimated from the resulting signal from the rotating accelerometer, using mathematical techniques related to those described above, but generalized from the case of multiple static measurements to the case of continual rotating measurements.

Table 3 illustrates the effect of 10 nano-g accelerometer accuracy in the context of the Dawn mission's parameters; and Table 4 similarly illustrates the effect of 1 nano-g accelerometer accuracy. With this level of navigation accuracy, a mission like Dawn could easily travel for many weeks, even several months, between radio navigation sessions, incurring position estimation errors on the order of only a few hundred km, errors that are well within the tolerance of a spacecraft with a low-thrust propulsion system to correct for over the course of a long cruise.

TABLE 3

| t (days) | t (s) | $\delta a$ (m/s$^2$) | $\delta v$ (m/s) | $\delta x$ (km) |
| --- | --- | --- | --- | --- |
| 1 | 86400 | $9 \times 10^{-8}$ | 0.0078 | 0.34 |
| 10 | $8.64 \times 10^5$ | $9 \times 10^{-8}$ | 0.078 | 33.6 |
| 100 | $8.64 \times 10^6$ | $9 \times 10^{-8}$ | 0.78 | 3,360 |
| 500 | $4.32 \times 10^7$ | $9 \times 10^{-8}$ | 3.9 | 84,000 |

TABLE 4

| t (days) | t (s) | $\delta a$ (m/s$^2$) | $\delta v$ (m/s) | $\delta x$ (km) |
| --- | --- | --- | --- | --- |
| 1 | 86400 | $9 \times 10^{-9}$ | 0.0008 | 0.034 |
| 10 | $8.64 \times 10^5$ | $9 \times 10^{-9}$ | 0.008 | 3.36 |
| 100 | $8.64 \times 10^6$ | $9 \times 10^{-9}$ | 0.08 | 336 |
| 500 | $4.32 \times 10^7$ | $9 \times 10^{-9}$ | 0.39 | 8,400 |

Using a high-accuracy accelerometer, such as a VEGA-type accelerometer, aboard a spacecraft using a low-thrust propulsion system could yield benefits for that mission and for other deep-space missions as well. Virtually all past interplanetary space missions have communicated with Earth using NASA's Deep Space network (DSN), or an equivalent communications system operated by one of a few other nations (the European Space Agency, Japan, Russia and India, for example). Those networks employ large, expensive radio tracking antennas, via which they can not only communicate with spacecraft at distances of hundreds of millions of kilometers, but can also perform radio tracking, measuring the range to the spacecraft and the rate of change of that range using radio techniques. These measurements are then processed to estimate a "navigation solution" defining the spacecraft's trajectory. As noted above, for example, NASA's DAWN spacecraft operators conducted communications and tracking sessions with Dawn typically once per week during that spacecraft's cruise phase. However, these tracking networks are expensive to operate, and the cost of operating them is typically charged to the space missions making use of their services. For deep space missions lasting many years, that cost can climb into the tens of millions of dollars. By providing a means by which the number of tracking sessions per year for a given mission could be reduced, the use of high-accuracy accelerometers on-board such spacecraft could reduce mission operations costs.

Radio tracking sometimes also includes the use of radio interferometric methods to measure the direction of the spacecraft perpendicular to the line of sight between the radio tracking stations on Earth and the spacecraft. Technology is being developed to replace or augment existing radio tracking techniques with optical tracking techniques, whereby laser optical communications links are established between an Earth tracking station and the spacecraft, and the range between these two is determined by measuring the time lag between sending a signal from Earth along the uplink and receiving a reply along the downlink. Further, radio and/or optical tracking stations in space, for example in Earth orbit, could be used instead of or in addition to ones on the surface of the Earth. For the most part, these external reference navigation units act in a similar way using measurements made by a purely Earth-based range and range-rate radio tracking station.

According to current practice, a low-thrust space mission's ground controllers might monitor for degradation or performance variation of the thruster once per week, for example, by conducting a radio navigation session using DSN once per week, and comparing the resulting trajectory estimate with a predicted trajectory result, with deviations between these signaling some change in the thruster's performance versus expectations. In this example, the weekly cadence may be chosen to be frequent enough that even if the thruster mis-performed seriously, the amount of trajectory deviation that built up over that period of time would be tolerable, and could be corrected subsequently. In that approach, if the spacecraft tracking sessions were conducted less frequently, then thruster problems could result in much larger trajectory deviations before they were caught, potentially large enough to consume an undesirable amount of propellant or mission time to correct, perhaps even jeopardizing the mission's ability to reach its destination.

If instead the spacecraft carried a sufficiently accurate accelerometer, the measured non-gravitational acceleration of the spacecraft could be compared continuously with the desired acceleration due to the commanded thrust value, and the deviation of the trajectory from the expected trajectory could be estimated continuously. This could be done on-board the spacecraft, autonomously and in real-time, by one or more processors running suitable software stored in memory on-board the spacecraft. This software could be initialized by an initial spacecraft position and velocity estimate uploaded from the ground control station, determined using an external reference navigation unit, such as a radio tracking unit. The spacecraft could include a navigation alarm programmed to send an alarm signal to Earth, for example through a low-power radio link independent of the high-data-rate deep-space tracking network, if its thruster's performance deviated too much from its expected performance, or if its trajectory deviated too much from the expected trajectory. Alarm thresholds could be determined in advance by the spacecraft's operators. In this approach, if the spacecraft's thruster continued to operate close to its expected thrust value, and the spacecraft was following its expected trajectory closely enough, then no alarm would be sent, or alternately a signal could be sent positively confirming normal performance; in which case the next radio tracking session could be postponed. If, for example, by this means the frequency of tracking sessions could be reduced from once per week to once per month, an important component of the mission's operations cost could be reduced by 75%. This would be of significant benefit to that mission.

An additional benefit would also arise for the Earth-based component of the external reference navigation systems (e.g. the radio tracking systems), and for other space missions relying on it. DSN, as well as all other deep-space tracking and communications systems, are in increasingly high demand, as the number of deep-space missions being operated each year increases, each of those missions needing some tracking support. The level of demand is high enough that these tracking systems frequently run at full capacity, and are either unable to support any new missions for some period of time, or else must ration out the available time at each of their tracking stations amongst the various missions requesting their support, providing less tracking time than some missions would otherwise desire. The use of high-accuracy accelerometers to allow some deep-space missions—for example those operating low-thrust propulsion systems for long periods of time—to monitor their own trajectories autonomously, could reduce the amount of radio tracking time that such missions would need, thus reducing the demand pressure on Earth's overworked deep-space tracking systems. This could allow more deep-space missions to be supported within current tracking-system capabilities, which would benefit those additional missions. It could also postpone the need to upgrade current tracking-system capabilities, which would benefit the organizations which maintain those tracking systems.

In an alternate embodiment, the trajectory estimate and subsequent navigation solution determined on-board, based on the accelerometer measurements, can be used in a trajectory-control feedback control system, in which the magnitude and direction of the thrust is varied autonomously, to correct the spacecraft's trajectory for variations detected by the accelerometer. An automatic thrusting alert could be reported to the spacecraft's operators by the same sort of low-bandwidth radio link as described above, keeping them apprised of the spacecraft's situation without consuming expensive, scarce deep-space tracking facility time.

The above description contemplated the situation where a spacecraft "cruising" between destinations in deep space, for example from high Earth orbit to a target asteroid, and is far away from either end of the trajectory. A similar approach may be used while close to Earth, for example while operating a low-thrust propulsion system to "spiral" out of Earth orbit, in the manner of ESA's SMART-1 mission from high Earth orbit to Lunar orbit. Accelerometers may be used to provide autonomous, on-board real-time monitoring of the thruster's performance and of the spacecraft's evolving trajectory, to reduce the amount of deep-space tracking resources needed to support such a mission. In another near-Earth example, embodiments of the systems and methods described herein employing high-accuracy accelerometers could be used on-board global navigation satellite system (GNSS) satellites, such as the satellites in the GPS constellation. In this example, the systems and methods described herein could be used to directly measure small non-ballistic accelerations from effects such as solar radiation pressure, allowing the operators of such satellites to better model changes with respect to time of the orbits of those satellites, leading in turn to better navigation performance for users of the GNSS.

Similarly, this type of technique may be used after arrival at a planetary target, for example an asteroid. At that point, the spacecraft's low-thrust propulsion system may be used to manoeuvre around the vicinity of the asteroid, or to hold station with respect to the asteroid, potentially at a short enough distance from the asteroid that collision between the spacecraft and the asteroid would be a risk. In such a case, the position of the spacecraft with respect to the asteroid may be estimated autonomously on-board the spacecraft using inertial navigation based on accelerometer measurements, along with auxiliary information provided by ground controllers regarding the spacecraft's initial position, and the asteroid's size, shape and spin characteristics. This position estimate may be used to control the spacecraft's propulsion system, to autonomously maintain a desired position or trajectory with respect to the asteroid, for example to allow the spacecraft to approach the asteroid more closely without an increased risk of collision.

Figure 6:
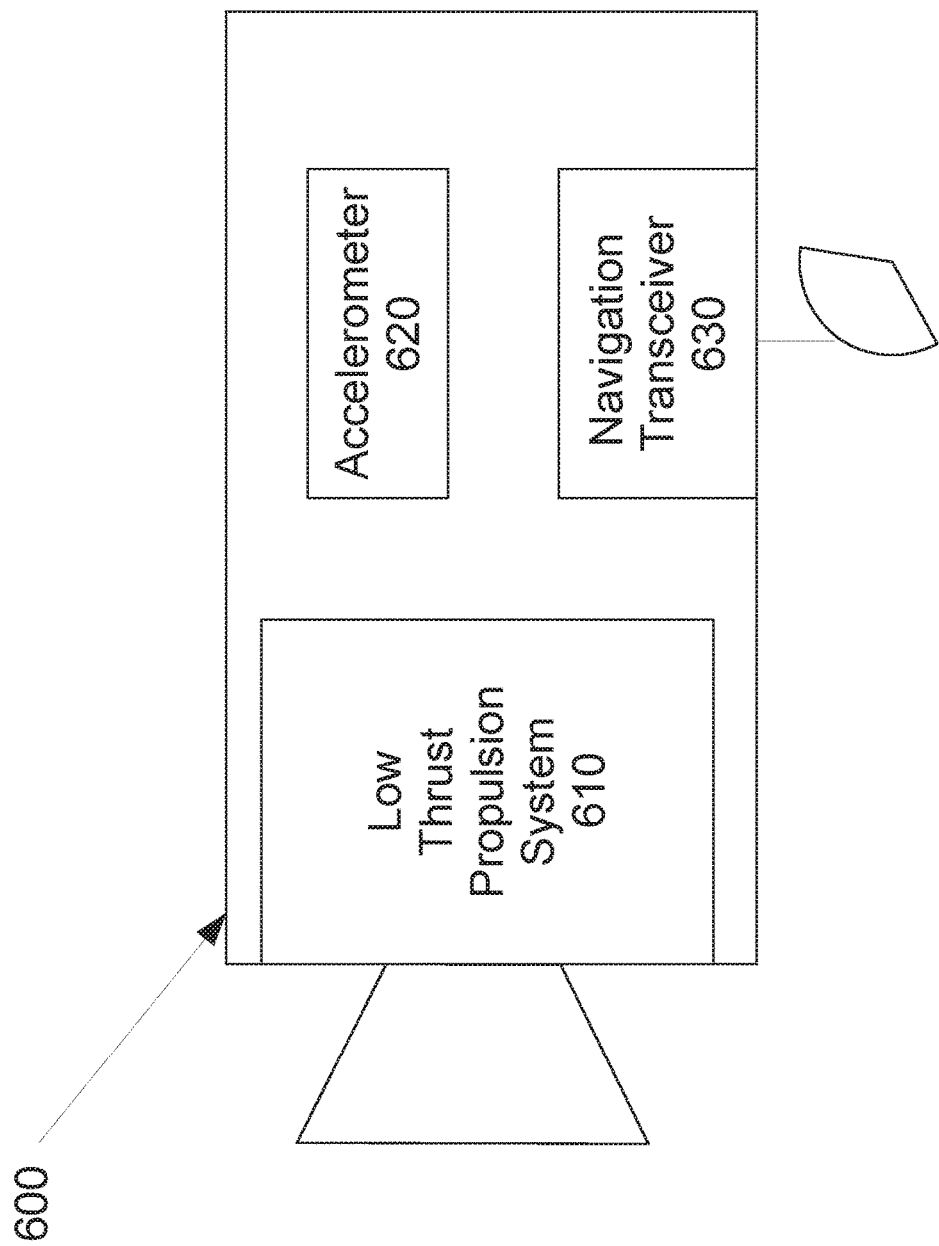
FIG. 6 is a block diagram of a low thrust spacecraft.

FIG. 6 shows a low thrust spacecraft 600, including low thrust propulsion system 610, accelerometer 620 and spacecraft communications and/or navigation transceiver 630. Low thrust propulsion system 610 is a spacecraft propulsion system designed to operate continuously for periods of days or weeks while producing low thrust. For example, the low thrust propulsion system 610 may include ion engines, solar sails, Hall thrusters, VASIMIR thrusters and the like.

Accelerometer 620 is an accelerometer with sufficiently high accuracy, as described above. More specifically, accelerometer 620 is able to measure the non-gravitational acceleration of spacecraft 600 more accurately than the uncertainty in the non-ballistic acceleration of the spacecraft due to natural forces, the operation of the propulsion system, and forces from other equipment on the spacecraft. Accelerometer 620 may be a VEGA type accelerometer as described above. If accelerometer 620 is a VEGA type accelerometer, it may take measurements as described above.

Spacecraft navigation transceiver 630 is a spacecraft communications and/or navigation transceiver able to send and receive communications at long distance and is compatible with radio or optical tracking systems. Spacecraft navigation transceiver 630 is an example component of an external reference navigation system, such as those described herein above.

The spacecraft 600 may also include at least one processor and a memory. The memory may have stored thereon instruction for configuring the processor to analyze acceleration measurements captured by accelerometer 620. An on-board processor may enable inertial navigation of the spacecraft using acceleration measurement signals from the accelerometer 620 to determine changes in the velocity and position of the spacecraft 600, without requiring the spacecraft navigation transceiver 630 to communicate with a remote tracking system.

Figure 7:
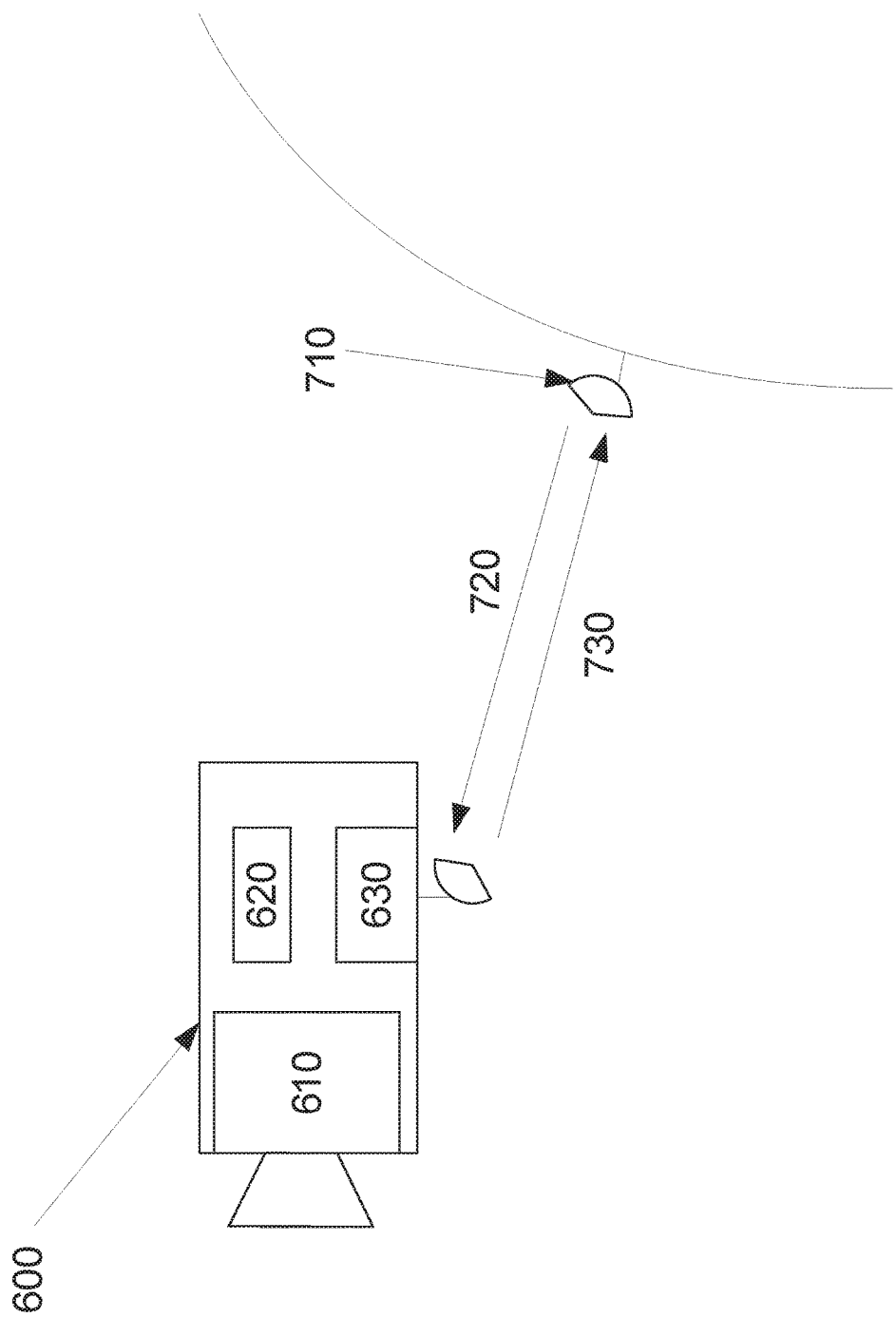
FIG. 7 is a block diagram of a low thrust spacecraft in communication with a radio tracking station transceiver.

FIG. 7 shows the low thrust spacecraft 600 in communication with a radio or optical communications and/or tracking station transceiver 710. Radio or optical tracking station transceiver 710 may be part of a ground station on Earth, such as a DSN tracking station as shown, or may be positioned on another spacecraft, for example a TDRS satellite. Communication is two way and comprises communications uplink 720 and communications downlink 730. Transceiver 710 is an example of a ground station that can be used in conjunction with an external reference navigation unit, such as spacecraft navigation transceiver 630.

In the simplest mode of operation, once spacecraft 600 is in space and a manoeuvre is desired, spacecraft navigation transceiver 630 communicates with radio or optical tracking station transceiver 710 to collect enough tracking data to allow a spacecraft trajectory state to be estimated. Following this, spacecraft 600 then orients in the appropriate direction, begins measuring acceleration using accelerometer 620 and engages low thrust propulsion system 610. Accelerometer 620 continues to measure spacecraft acceleration for as long as low thrust propulsion system 610 is engaged. After a predetermined time, spacecraft navigation transceiver 630 again communicates with radio or optical tracking station transceiver 710 to estimate a revised spacecraft trajectory state. This process repeats until the desired manoeuvre is complete. Low thrust propulsion system 610 may remain active during communications or may shut down if, for example, spacecraft 600 must re-orient itself to communicate or if operation of low thrust propulsion system 610 interferes with tracking functions. The sensitivity of accelerometer 620 allows the predetermined time between radio tracking, although dependent on mission parameters, to be as long as several months. More complex implementations are also possible. For example, radio or optical tracking can be carried out while low thrust propulsion system is operating.

Several embodiments have been described herein and those of skill in the art will now recognize that it is possible to combine them to achieve the desired result of measuring the acceleration and inertial navigation of a spacecraft in a variety of conditions and for a variety of uses. It will also be understood by persons skilled in the art that other variants and modifications may be made without departing from the scope of the embodiments as defined in the claims appended hereto.

What is claimed is:

1. An inertial navigation system for a low thrust spacecraft undergoing a prolonged non-zero non-ballistic acceleration, the system comprising:
 an accelerometer configured to measure the prolonged non-zero non-ballistic acceleration of the spacecraft; and
 a processor configured to estimate a trajectory state of the spacecraft directly using acceleration measurements of the prolonged non-zero non-ballistic acceleration from the accelerometer, wherein the trajectory state is estimated by determining a change in a velocity of the low thrust spacecraft from an integral of the acceleration measurements and determining a change in a position of the low thrust spacecraft from the change in velocity;
 wherein an inaccuracy of the accelerometer is less than an uncertainty in an accuracy of a modeled non-gravitational component of the acceleration of the spacecraft.

2. The system of claim 1 wherein the inaccuracy of the accelerometer is 1 micro-g or less.

3. The system of claim 1 wherein the accelerometer is rotatable.

4. The system of claim 3 wherein the accelerometer is configured to take at least two measurements separated by an angular distance and the processor is configured to use the at least two measurements to calculate an instrument bias and a corrected acceleration measurement.

5. The system of claim 3 wherein the accelerometer is configured to continuously rotate.

6. The system of claim 3, wherein the accelerometer is configured for:
 rotation into a first orientation aligned with a positive thrust direction;
 taking a first acceleration measurement at the first orientation;
 rotation into a second orientation aligned with a negative thrust direction;
 taking a second acceleration measurement at the second orientation; and
 the processor is configured for calculating an instrument bias and a corrected acceleration measurement from the first acceleration measurement and the second acceleration measurement.

7. A method of navigating a low thrust spacecraft having a low thrust propulsion system, the method comprising:
 engaging the low thrust propulsion system over a prolonged period;
 measuring a non-zero non-ballistic acceleration of the spacecraft during the prolonged period using an accelerometer with an inaccuracy less than an uncertainty in an acceleration imparted by the low thrust propulsion system; and estimating a trajectory state using the measured acceleration by determining a change in a velocity of the low thrust spacecraft from an integral of the measured acceleration and determining a change in a position of the low thrust spacecraft from the change in velocity.

8. The method of claim 7 wherein the inaccuracy of the accelerometer is 1 micro-g or less.

9. The method of claim 7 wherein the accelerometer is rotatable.

10. The method of claim 9 wherein the accelerometer takes at least two measurements separated by an angular distance and the at least two measurements are used to calculate an instrument bias and a corrected acceleration measurement.

11. The method of claim 9 wherein the accelerometer is continuously rotating.

12. The method of claim 9 wherein measuring the acceleration of the spacecraft comprises:
aligning the accelerometer with a positive thrust direction and taking a first acceleration measurement;
aligning the accelerometer with a negative thrust direction and taking a second acceleration measurement; and
calculating an instrument bias and a corrected acceleration measurement from the first acceleration measurement and the second acceleration measurement.

13. The method of claim 7 further comprising:
updating the trajectory state using an external reference navigation unit.

14. A method of providing inertial navigation capability for a low thrust spacecraft:
providing an accelerometer configured to measure a a prolonged non-zero non-ballistic acceleration of the spacecraft, wherein an inaccuracy of the accelerometer is less than an uncertainty in an accuracy of a modeled non-gravitational component of an acceleration of the spacecraft;
determining a change in a velocity of the low thrust spacecraft from an integral of the acceleration measurements; and
determining a change in a position of the low thrust spacecraft from the change in velocity.

15. The method of claim 14, wherein the inaccuracy of the accelerometer is 1 micro-g or less.

16. The method of claim 14, wherein the accelerometer is rotatable.

17. The method of claim 16, wherein the accelerometer is configured to take at least two measurements separated by an angular distance, wherein the at least two measurements are used to calculate an instrument bias and a corrected acceleration measurement.

18. The method of claim 16 wherein the accelerometer is configured to continuously rotate.

19. The method of claim 16, wherein the accelerometer is configured for:
rotation into a first orientation aligned with a positive thrust direction;
taking a first acceleration measurement at the first orientation;
rotation into a second orientation aligned with a negative thrust direction; and
taking a second acceleration measurement at the second orientation;
wherein the first acceleration measurement and the second acceleration measurement are used to calculate an instrument bias and a corrected acceleration measurement.

20. A low thrust spacecraft comprising:
a propulsion system;
an accelerometer configured to measure a prolonged non-zero non-ballistic acceleration of the spacecraft, wherein an inaccuracy of the accelerometer is less than an uncertainty in an accuracy of a modeled non-gravitational component of an acceleration of the spacecraft; and
a processor configured to estimate a trajectory state of the low thrust spacecraft directly using acceleration measurements of the prolonged non-zero non-ballistic acceleration from the accelerometer, wherein the trajectory state is estimated by determining a change in a velocity of the low thrust spacecraft from an integral of the acceleration measurements and determining a change in a position of the low thrust spacecraft from the change in velocity.

21. The spacecraft of claim 20, wherein the inaccuracy of the accelerometer is 1 micro-g or less.

22. The spacecraft of claim 20, wherein the accelerometer is rotatable.

23. The spacecraft of claim 22, wherein the accelerometer is configured to take at least two measurements separated by an angular distance and the at least two measurements are used to calculate an instrument bias and a corrected acceleration measurement.

24. The spacecraft of claim 22, wherein the accelerometer is configured to continuously rotate.

25. The spacecraft of claim 22, wherein the accelerometer is configured for:
rotation into a first position aligned with a positive thrust direction;
taking a first acceleration measurement at the first position;
rotation into a second position aligned with a negative thrust direction; and
taking a second acceleration measurement at the second position;
wherein the first acceleration measurement and the second acceleration measurement are used to calculate an instrument bias and a corrected acceleration measurement.

26. The spacecraft of claim 20 further comprising an external reference navigation unit.

27. The spacecraft of claim 26, wherein the external reference navigation unit comprises a transceiver configured to send and receive tracking signals.

28. A method of navigating a spacecraft undergoing prolonged non-zero non-ballistic acceleration, the method comprising:
measuring the prolonged non-zero non-ballistic acceleration of the spacecraft using an accelerometer with an inaccuracy less than an uncertainty in an accuracy of a model of the prolonged non-zero non-ballistic acceleration of the spacecraft; and
estimating a trajectory state directly using the measured prolonged non-zero non-ballistic acceleration, wherein the trajectory state is estimated by determining a change in a velocity of the spacecraft from an integral of the acceleration measurements and determining a change in a position of the spacecraft from the change in velocity.

29. The method of claim 28 wherein measuring the acceleration of the spacecraft comprises:
taking a first acceleration measurement with the accelerometer rotated to a first direction relative to an inertial reference frame;
taking a second acceleration measurement with the accelerometer rotated to a second direction relative to the inertial reference frame; and calculating an instrument bias and a corrected acceleration measurement from the first acceleration measurement and the second acceleration measurement.

30. The method of claim 28, wherein the accelerometer is continuously rotating.

31. A spacecraft comprising:
an accelerometer configured to measure a prolonged non-zero non-ballistic acceleration of the spacecraft, wherein an inaccuracy of the accelerometer is less than an uncertainty in an accuracy of a modeled non-gravitational component of a prolonged acceleration of the spacecraft; and
a processor configured to estimate a trajectory state of the spacecraft directly using the prolonged non-zero non-ballistic acceleration measurements from the accelerometer, wherein the trajectory state is estimated by determining a change in a velocity of the low thrust spacecraft from an integral of the acceleration measurements and determining a change in a position of the low thrust spacecraft from the change in velocity.

32. The spacecraft of claim 31, wherein:
the accelerometer is configured to take at least two measurements separated by an angular distance; and
the processor is configured to estimate the trajectory state using the at least two measurements to calculate an instrument bias and a corrected acceleration measurement.

33. The spacecraft of claim 31, wherein the accelerometer is configured to continuously rotate.

* * * * *

UNITED STATES PATENT AND TRADEMARK OFFICE
CERTIFICATE OF CORRECTION

PATENT NO.        : 10,046,869 B2
APPLICATION NO.   : 15/009005
DATED             : August 14, 2018
INVENTOR(S)       : Kieran A. Carroll et al.

It is certified that error appears in the above-identified patent and that said Letters Patent is hereby corrected as shown below:

In Claim 14, delete the phrase "measure a a" at Column 29, Line 31, and insert the phrase --measure a--.

Signed and Sealed this
Ninth Day of July, 2019

Andrei Iancu
*Director of the United States Patent and Trademark Office*